United States Patent
Byrne

(10) Patent No.: US 11,181,101 B2
(45) Date of Patent: Nov. 23, 2021

(54) PUMP DRIVETRAIN DAMPER SYSTEM AND CONTROL SYSTEMS AND METHODS FOR SAME

(71) Applicant: SPM Oil & Gas Inc., Fort Worth, TX (US)

(72) Inventor: Joseph H. Byrne, Hudson Oaks, TX (US)

(73) Assignee: SPM Oil & Gas Inc., Fort Worth, TX (US)

(*) Notice: Subject to any disclaimer, the term of this patent is extended or adjusted under 35 U.S.C. 154(b) by 81 days.

(21) Appl. No.: 16/408,643

(22) Filed: May 10, 2019

(65) Prior Publication Data

US 2019/0264667 A1 Aug. 29, 2019

Related U.S. Application Data

(63) Continuation of application No. 14/752,073, filed on Jun. 26, 2015, now Pat. No. 10,316,832.
(Continued)

(51) Int. Cl.
*F04B 9/02* (2006.01)
*F16D 37/02* (2006.01)
(Continued)

(52) U.S. Cl.
CPC ............ *F04B 9/02* (2013.01); *F04B 1/07* (2013.01); *F04B 17/05* (2013.01); *F04B 19/22* (2013.01);
(Continued)

(58) Field of Classification Search
CPC .... F04B 9/02; F04B 1/07; F04B 17/05; F04B 49/065; F04B 53/001; F04B 47/00;
(Continued)

(56) References Cited

U.S. PATENT DOCUMENTS 364,627 A 6/1887 Arnold
879,560 A 2/1908 Daniel
(Continued)

FOREIGN PATENT DOCUMENTS

BR 8700642 A 8/1988
CA 2686204 A1 5/2010
(Continued)

OTHER PUBLICATIONS

Dirk Guth, Markus Schamoni, Dennis Cording, Jurgen Maas, "New technology for a high dynamical MRF-clutch for safe and energy-efficient use in powertrain," FISITA 2012 World Automotive Congress, Beijing, China, Nov. 27-30, 2012, 31 pages.
(Continued)

*Primary Examiner* — Peter J Bertheaud
(74) *Attorney, Agent, or Firm* — Wei Wei Jeang; Grable Martin Fulton PLLC

(57) ABSTRACT

In one aspect, there is provided a damper control system for a reciprocating pump assembly according to which control signals are sent to electromagnets. In another aspect, there is provided a method of dampening vibrations in a pump drivetrain according to which a beginning of torque variation is detected and at least a portion of the torque variation is negated. In another aspect, signals or data associated with pump characteristics are received from sensors, torque characteristics and damper response voltages per degree of crank angle are calculated, and control signals are sent to electromagnets. In another aspect, a damper system includes a fluid chamber configured to receive a magnetorheological fluid; a flywheel disposed at least partially within the fluid chamber and adapted to be operably coupled to a fluid pump crankshaft; and a magnetic device proximate the flywheel. The magnetic device applies a variable drag force to the flywheel.

24 Claims, 15 Drawing Sheets

Related U.S. Application Data

(60) Provisional application No. 62/019,610, filed on Jul. 1, 2014, provisional application No. 62/018,310, filed on Jun. 27, 2014.

(51) Int. Cl.

| | |
|---|---|
| *F04B 49/06* | (2006.01) |
| *F04B 1/07* | (2006.01) |
| *F04B 17/05* | (2006.01) |
| *F04B 19/22* | (2006.01) |
| *F04B 53/00* | (2006.01) |
| *F16D 57/00* | (2006.01) |
| *F16D 57/02* | (2006.01) |
| *F16D 37/00* | (2006.01) |
| *F04B 47/00* | (2006.01) |
| *F04B 49/10* | (2006.01) |

(52) U.S. Cl.
CPC ............ *F04B 47/00* (2013.01); *F04B 49/065* (2013.01); *F04B 49/10* (2013.01); *F04B 53/001* (2013.01); *F04B 53/006* (2013.01); *F16D 37/008* (2013.01); *F16D 37/02* (2013.01); *F16D 57/002* (2013.01); *F16D 57/02* (2013.01); *F16D 2037/002* (2013.01); *F16D 2037/004* (2013.01); *F16D 2037/005* (2013.01); *F16D 2037/007* (2013.01)

(58) Field of Classification Search
CPC ........ F04B 49/10; F04B 19/22; F04B 53/006; F16D 37/02; F16D 2037/002; F16D 57/002; F16D 37/008; F16D 2037/005; F16D 2037/007; F16D 2037/004; F16D 57/02

See application file for complete search history.

(56) References Cited

U.S. PATENT DOCUMENTS

| | | |
|---|---|---|
| 1,418,202 A | 5/1922 | Parsons |
| 1,707,228 A | 4/1929 | Knapp |
| 1,867,585 A | 7/1932 | Moore |
| 1,890,428 A | 12/1932 | Ferris et al. |
| 1,926,925 A | 9/1933 | Wescott |
| 2,056,622 A | 10/1936 | Schaer |
| 2,420,779 A | 5/1947 | Holmes |
| 2,428,602 A | 10/1947 | Yingling |
| 2,443,332 A | 6/1948 | Summers |
| 2,665,555 A | 1/1954 | Martinsson |
| 2,682,433 A | 6/1954 | Maier |
| 2,755,739 A | 7/1956 | Euwe |
| 2,766,701 A | 10/1956 | Giraudeau |
| 2,823,085 A | 2/1958 | Keylwert |
| 2,878,990 A | 3/1959 | Zurcher |
| 2,991,003 A | 7/1961 | Petersen |
| 3,039,317 A | 6/1962 | Wilson |
| 3,049,082 A | 8/1962 | Barry |
| 3,137,179 A | 6/1964 | Moorhead |
| 3,158,211 A | 11/1964 | McCue et al. |
| 3,163,474 A | 12/1964 | Wilson |
| 3,168,665 A | 2/1965 | Holper |
| 3,179,451 A | 4/1965 | Blank, Sr. |
| 3,206,242 A | 9/1965 | Fensin |
| 3,207,142 A | 9/1965 | Gorissen et al. |
| 3,236,315 A | 2/1966 | Lora |
| 3,356,036 A | 12/1967 | Repp |
| 3,358,352 A | 12/1967 | Wilcox |
| 3,487,892 A | 1/1970 | William |
| 3,595,101 A | 7/1971 | Jesse, Jr. |
| 3,757,149 A | 9/1973 | Holper |
| 3,760,694 A | 9/1973 | Lieb |
| 3,883,941 A | 5/1975 | Coil |
| 3,967,542 A | 7/1976 | Hall et al. |
| 4,013,057 A | 3/1977 | Guenther |
| 4,048,909 A | 9/1977 | Jepsen |
| 4,099,447 A | 7/1978 | Ogles |
| 4,140,442 A | 2/1979 | Mulvey |
| 4,191,238 A | 3/1980 | Pichl |
| 4,210,399 A | 7/1980 | Jain |
| 4,211,190 A | 7/1980 | Indech |
| 4,246,908 A | 1/1981 | Inagaki et al. |
| 4,269,569 A | 5/1981 | Hoover |
| 4,338,054 A | 7/1982 | Dahl |
| 4,381,179 A | 4/1983 | Pareja |
| 4,388,837 A | 6/1983 | Bender |
| 4,476,772 A | 10/1984 | Gorman et al. |
| 4,477,237 A | 10/1984 | Grable |
| 4,494,415 A | 1/1985 | Elliston |
| 4,512,694 A | 4/1985 | Foran et al. |
| 4,606,709 A | 8/1986 | Chisolm |
| 4,667,627 A | 5/1987 | Matsui et al. |
| 4,705,459 A | 11/1987 | Buisine et al. |
| 4,762,051 A | 8/1988 | Besic et al. |
| 4,771,801 A | 9/1988 | Crump et al. |
| 4,803,964 A | 2/1989 | Kurek et al. |
| 4,809,646 A | 3/1989 | Paul et al. |
| 4,824,342 A | 4/1989 | Buck |
| 4,842,039 A | 6/1989 | Kelm |
| 4,876,947 A | 10/1989 | Rhodes |
| 4,887,518 A | 12/1989 | Hayakawa |
| 4,939,984 A | 7/1990 | Fletcher-Jones |
| 4,950,145 A | 8/1990 | Zanetos et al. |
| 4,966,109 A | 10/1990 | Pusic et al. |
| 5,031,512 A | 7/1991 | Graziani |
| 5,060,603 A | 10/1991 | Williams |
| 5,063,775 A | 11/1991 | Walker, Sr. et al. |
| 5,076,220 A | 12/1991 | Evans et al. |
| 5,078,580 A | 1/1992 | Miller et al. |
| 5,115,725 A | 5/1992 | Horiuchi |
| 5,135,031 A | 8/1992 | Burgess et al. |
| 5,156,534 A | 10/1992 | Burgy et al. |
| 5,216,943 A | 6/1993 | Adler et al. |
| 5,246,355 A | 9/1993 | Matzner et al. |
| 5,247,873 A | 9/1993 | Owens et al. |
| 5,287,612 A | 2/1994 | Paddock et al. |
| 5,313,061 A | 5/1994 | Drew et al. |
| 5,337,612 A | 8/1994 | Evans |
| 5,370,093 A | 12/1994 | Hayes |
| 5,425,306 A | 6/1995 | Binford |
| 5,560,332 A | 10/1996 | Chang |
| 5,594,665 A | 1/1997 | Walter et al. |
| 5,598,908 A | 2/1997 | York et al. |
| 5,658,250 A | 8/1997 | Blomquist et al. |
| 5,671,655 A | 9/1997 | Vollrath |
| 5,673,666 A | 10/1997 | Beardmore et al. |
| 5,678,460 A | 10/1997 | Walkowc |
| 5,772,403 A | 6/1998 | Allison et al. |
| 5,839,888 A | 11/1998 | Harrison |
| 5,846,056 A | 12/1998 | Dhindsa et al. |
| 5,855,397 A | 1/1999 | Black et al. |
| 5,896,965 A | 4/1999 | Gopalswamy et al. |
| 5,967,273 A | 10/1999 | Hampton |
| 5,984,645 A | 11/1999 | Cummings |
| 6,260,004 B1 | 7/2001 | Hays et al. |
| 6,330,525 B1 | 12/2001 | Hays et al. |
| 6,419,459 B1 | 7/2002 | Sibbing |
| 6,557,457 B1 | 5/2003 | Hart et al. |
| 6,644,933 B2 | 11/2003 | Light et al. |
| 6,663,349 B1 | 12/2003 | Discenzo et al. |
| 6,697,741 B2 | 2/2004 | Yu et al. |
| 6,702,221 B2 | 3/2004 | Haber et al. |
| 6,718,955 B1 | 4/2004 | Knight |
| D495,342 S | 8/2004 | Tojo et al. |
| D496,670 S | 9/2004 | Ohnishi |
| 6,853,110 B1 | 2/2005 | Durham et al. |
| 6,859,740 B2 | 2/2005 | Stephenson et al. |
| 6,873,267 B1 | 3/2005 | Tubel et al. |
| 6,882,960 B2 | 4/2005 | Miller |
| 6,920,753 B2 | 7/2005 | Namuduri |
| 7,111,604 B1 | 9/2006 | Hellenbroich |
| D538,824 S | 3/2007 | Tojo |
| 7,219,594 B2 | 5/2007 | Kugelev et al. |

(56) References Cited

U.S. PATENT DOCUMENTS

| | | |
|---|---|---|
| 7,220,119 B1 | 5/2007 | Kirchmer et al. |
| 7,272,533 B2 | 9/2007 | Schlosser et al. |
| 7,364,412 B2 | 4/2008 | Kugelev et al. |
| 7,374,005 B2 | 5/2008 | Gray et al. |
| 7,404,704 B2 | 7/2008 | Kugelev et al. |
| 7,461,731 B2 | 12/2008 | Steinwender |
| D591,311 S | 4/2009 | Tojo |
| 7,588,384 B2 | 9/2009 | Yokohara |
| 7,610,847 B2 | 11/2009 | McKelroy |
| 7,621,179 B2 | 11/2009 | Ens et al. |
| 7,623,986 B2 | 11/2009 | Miller et al. |
| 7,866,153 B2 | 1/2011 | Sollie et al. |
| 7,931,078 B2 | 4/2011 | Toporowski et al. |
| 8,100,048 B2 | 1/2012 | Christopher |
| 8,162,631 B2 | 4/2012 | Patel et al. |
| D658,684 S | 5/2012 | Roman |
| D670,312 S | 11/2012 | Alexander et al. |
| 8,376,723 B2 | 2/2013 | Kugelev et al. |
| D678,628 S | 3/2013 | Krueger |
| D678,911 S | 3/2013 | Prevost |
| D682,317 S | 5/2013 | Carruth et al. |
| D685,393 S | 7/2013 | Prevost |
| 8,529,230 B1 | 9/2013 | Colley, III et al. |
| D692,026 S | 10/2013 | Alexander et al. |
| D693,200 S | 11/2013 | Saunders |
| D698,502 S | 1/2014 | Krueger |
| D700,622 S | 3/2014 | Carruth et al. |
| 8,707,853 B1 | 4/2014 | Dille et al. |
| D704,385 S | 5/2014 | Hoofman |
| D708,401 S | 7/2014 | Krueger |
| D713,101 S | 9/2014 | Bruno et al. |
| 8,833,301 B2 | 9/2014 | Donegan et al. |
| 8,833,302 B2 | 9/2014 | Donegan et al. |
| 8,857,374 B1 | 10/2014 | Donegan et al. |
| 10,316,832 B2 * | 6/2019 | Byrne .................. F16D 57/002 |
| 2002/0020460 A1 | 2/2002 | Viken |
| 2002/189587 A1 | 12/2002 | Hirano |
| 2003/0024386 A1 | 2/2003 | Burke |
| 2003/0079604 A1 | 5/2003 | Seo |
| 2003/0118104 A1 | 6/2003 | Zaccarin |
| 2004/0213104 A1 | 10/2004 | Matzner et al. |
| 2004/0219040 A1 | 11/2004 | Kugelev et al. |
| 2004/0244577 A1 | 12/2004 | Haughom |
| 2006/0029502 A1 | 2/2006 | Kugelev et al. |
| 2007/0041847 A1 | 2/2007 | Inoue et al. |
| 2007/0041849 A1 | 2/2007 | Allen |
| 2007/0044776 A1 | 3/2007 | Gradu et al. |
| 2007/0099746 A1 | 5/2007 | Hahlbeck |
| 2007/0144842 A1 | 6/2007 | Zhou |
| 2008/0006148 A1 | 1/2008 | McKelroy |
| 2008/0078583 A1 | 4/2008 | Cummins |
| 2008/0213115 A1 | 9/2008 | Hilger et al. |
| 2008/0271562 A1 | 11/2008 | Yasuhara et al. |
| 2009/0084260 A1 | 4/2009 | Christopher |
| 2009/0092510 A1 | 4/2009 | Williams et al. |
| 2010/0044028 A1 | 2/2010 | Brooks |
| 2010/0129245 A1 | 5/2010 | Patel et al. |
| 2010/0129249 A1 | 5/2010 | Bianchi et al. |
| 2010/0158726 A1 | 6/2010 | Donald et al. |
| 2010/0160710 A1 | 6/2010 | Strickland |
| 2010/0172778 A1 | 7/2010 | Kugelev et al. |
| 2010/0242720 A1 | 9/2010 | Matzner et al. |
| 2010/0260631 A1 | 10/2010 | Kugelev et al. |
| 2010/0322802 A1 | 12/2010 | Kugelev |
| 2012/0141305 A1 | 6/2012 | Landers et al. |
| 2012/0144995 A1 | 6/2012 | Bayyouk et al. |
| 2012/0148430 A1 | 6/2012 | Hubenschmidt et al. |
| 2012/0167759 A1 | 7/2012 | Chinthan et al. |
| 2013/0064696 A1 | 3/2013 | Mccormick et al. |
| 2013/0206108 A1 | 8/2013 | Schüle et al. |
| 2013/0233165 A1 | 9/2013 | Mark et al. |
| 2014/0196570 A1 | 7/2014 | Small et al. |
| 2015/0377318 A1 | 12/2015 | Byrne |
| 2016/0025082 A1 | 1/2016 | Byrne et al. |
| 2016/0025088 A1 | 1/2016 | Byrne et al. |
| 2016/0025089 A1 | 1/2016 | Kumar et al. |
| 2016/0025090 A1 | 1/2016 | Bayyouk et al. |

FOREIGN PATENT DOCUMENTS

| | | |
|---|---|---|
| CA | 2749110 A1 | 7/2010 |
| CA | 2486126 C | 1/2013 |
| CA | 153846 | 9/2014 |
| CN | 2436688 Y | 6/2001 |
| CN | 2612816 Y | 4/2004 |
| CN | 1908435 A | 2/2007 |
| CN | 2926584 Y | 7/2007 |
| CN | 201092955 Y | 7/2008 |
| CN | 102439314 A | 5/2012 |
| CN | 103403351 A | 11/2013 |
| CN | ZL2009100265839 | 4/2014 |
| CN | ZL2013305556227 | 5/2014 |
| CN | 105264275 A | 1/2016 |
| DE | 1191069 B | 4/1965 |
| DE | 3234504 A1 | 4/1983 |
| DE | 3441508 A1 | 5/1986 |
| DE | 3802714 A1 | 8/1988 |
| DE | 4416120 A1 | 11/1995 |
| DE | 19653164 C2 | 3/2000 |
| DE | 19957568 A1 | 5/2001 |
| DE | 20120609 U1 | 3/2002 |
| DE | 10129046 B4 | 1/2006 |
| EP | 0300905 A1 | 1/1989 |
| EP | 0449278 A1 | 10/1991 |
| EP | 2397694 B1 | 8/2015 |
| FR | 2618509 A1 | 1/1989 |
| FR | 2820480 A1 | 8/2002 |
| GB | 2342421 B | 3/2003 |
| GB | 2419671 A | 5/2006 |
| GB | 2482786 B | 1/2015 |
| JP | 60175753 A | 9/1985 |
| JP | 10288086 A | 10/1998 |
| JP | 2920004 B2 | 7/1999 |
| JP | 11200947 A | 7/1999 |
| JP | 3974386 B2 | 9/2007 |
| JP | 2008539364 A | 11/2008 |
| KR | 1019990060438 | 7/1999 |
| KR | 1019990079544 | 11/1999 |
| KR | 100275877 B1 | 12/2000 |
| KR | 100287572 | 6/2001 |
| KR | 1020010065249 | 7/2001 |
| KR | 100302886 | 11/2001 |
| KR | 1020010108223 | 12/2001 |
| RU | 2037700 C1 | 6/1995 |
| SG | D20131413 G | 3/2014 |
| WO | WO-2008137515 A1 | 11/2008 |
| WO | WO-2010080961 A2 | 7/2010 |
| WO | WO-2010080963 A2 | 7/2010 |
| WO | WO-2011005571 A2 | 1/2011 |
| WO | WO-2012092452 A2 | 7/2012 |
| WO | WO-2013183990 A1 | 12/2013 |
| WO | WO-2014143094 | 9/2014 |
| WO | WO-2016014967 A1 | 1/2016 |
| WO | WO-2016014988 A1 | 1/2016 |
| WO | WO-2016015006 A1 | 1/2016 |
| WO | WO-2016015012 A1 | 1/2016 |
| WO | WO-2015200810 A3 | 2/2016 |

OTHER PUBLICATIONS

Examination Report issued by IP Australia for Australian Application No. 2015279647, dated May 16, 2018, 5 pages.

Extended European Search Report issued by the European Patent Office for European Application No. 15812256, dated Jun. 13, 2018, 12 pages.

International Search Report and Written Opinion received in International Application No. PCT/US15/38008, dated Nov. 27, 2015, 14 pages.

Official Action issued by the Eurasian Patent Office for Eurasian Application No. 201692452/31, dated Dec. 18, 2018, 4 pages (Translation).

(56) References Cited

OTHER PUBLICATIONS

Official Action issued by the Eurasian Patent Office for Eurasian Application No. 201692452/31, dated May 28, 2018, 2 pages (Translation).
Supplementary Partial European Search Report received in European Application No. 15812256, dated Feb. 13, 2018, 13 pages.
"Advisory Action dated Apr. 7, 2009, by the USPTO, re U.S. Appl. No. 10/833,921".
"Australia Exam Report, dated Feb. 9, 2015, by IP Australia, re App No. 2011352095".
"Canada Exam Report dated Jan. 11, 2016, by the CIPO, re App No. 2749110".
"Canada Exam Report, dated Oct. 22, 2015, by the CIPO, re App No. 2686204".
"Canadian Exam Report, dated Oct. 8, 2014, by CIPO, re App No. 2823213".
"Canadian Examiner's Report, by CIPO, dated May 13, 2014, re App No. 153846".
"Canadian Office Action dated May 17, 2011, re App No. 2486126".
"Chinese Office Action dated Mar. 15, 2013, re App No. 200910226583.9".
"Chinese Office Action, dated Sep. 2, 2014, by SIPO, re App No. 201080008236.X".
"Chinese Office Action dated Oct. 29, 2013, re App No. 201080008236X".
"Decision on Appeal mailed Feb. 20, 2013, by USPTO, re U.S. Appl. No. 10/831,467".
"Election Requirement, mailed Nov. 18, 2014, by the USPTO, re U.S. Appl. No. 29/455,618".
"Examiner's Answer dated Jan. 29, 2010, by USPTO, re U.S. Appl. No. 10/831,467".
"Examiner Interview Summary dated Apr. 10, 2008, by the USPTO, re U.S. Appl. No. 10/833,921".
"Examiner Interview Summary dated Jul. 17, 2008, by the USPTO, re U.S. Appl. No. 10/831,467".
"Gardner Denver Well Servicing Pump Model C-2500Q Power End Parts List, Feb. 2009".
"Simatec Smart Technologies, "Simatool Bearing Handling Tool BHT", Dec. 19, 2013".
"International Preliminary Report on Patentability, by the IPEA/US, dated Mar. 9, 2015, re PCT/US2013/040106".
"International Preliminary Report on Patentability dated Jan. 4, 2012, regarding PCT/US2010/039651".
"International Preliminary Reporton Patentability dated Jul. 12, 2011, regarding PCT/US2010/020445".
"International Preliminary Report on Patentability dated Jul. 12, 2011, regarding PCT/US2010/020447".
"International Search Report and Written Opinion, by the ISA/US, dated Mar. 4, 2015, re PCT/US2014/069567".
International Search Report and Written Opinion for Application No. PCT/US2010/020445 dated Aug. 3, 2010, 7 pages.
International Search Report and Written Opinion for Application No. PCT/US2010/020447 dated Aug. 3, 2010, 7 pages.
International Search Report and Written Opinion for Application No. PCT/US2010/039651 dated Feb. 24, 2011, 7 pages.
International Search Report and Written Opinion for Application No. PCT/US2011/067770 dated Aug. 28, 2012, 8 pages.
"International Search Report and Written Opinion dated Dec. 28, 2015, by the ISA/US, re PCT/US2015/042043".
"International Search Report and Written Opinion dated Dec. 4, 2015, by the ISA/US, re PCT/US2015/042078".
"International Search Report and Written Opinion dated Dec. 4, 2015, by the ISA/US, re PCT/US2015/042111".
"International Search Report and Written Opinion dated Jun. 29, 2015, by the ISA/US, re PCT/US2015/014898".
"International Search Report and Written Opinion dated Oct. 19, 2015, by the ISA/US, re PCT/US2015/042104".
"International Search Report and Written Opinion, dated Oct. 19, 2015, by the ISA/US, re PCT/US2015/042119".
"International Search Report and Written Opinion dated Sep. 5, 2013, by the ISA/US, re PCT/US2013/040106".
"Metaldyne, Torsional Vibration Dampers, Brochure".
"MSI/Dixie Iron Works, Ltd., Technical Manual for 600 HP Triplex MSI TI-600 Pump, Rev. P, 102 pages, date unknown".
"MSI/Dixie Iron Works, Ltd., Technical Manual for MSI Hybrid Well Service Pump Triplex and Quintuplex Models, Rev. D, 91 pages, date unknown".
"Notice of Allowance dated Dec. 23, 2011, by the USPTO, re U.S. Appl. No. 12/277,849".
"Notice of Allowance dated Feb. 12, 2016, by the USPTO, re U.S. Appl. No. 29/534,091".
"Notice of Allowance, dated Jan. 28, 2015, by the USPTO, re U.S. Appl. No. 29/455,618".
"Notice of Allowance dated Oct. 12, 2012, by the USPTO, re U.S. Appl. No. 12/683,804".
"Office Action / Restriction dated Mar. 29, 2016, by the USPTO, re U.S. Appl. No. 14/565,962".
"Office Action dated Apr. 19, 2012, by the USPTO, re U.S. Appl. No. 12/821,663".
"Office Action dated Jan. 18, 2013, by the USPTO, re U.S. Appl. No. 12/748,127".
"Office Action dated Jan. 2, 2014, by the USPTO, re U.S. Appl. No. 13/866,121".
"Office Action dated Jan. 21, 2009, by the USPTO, re U.S. Appl. No. 10/833,921".
"Office Action dated Jan. 27, 2012, by the USPTO, re U.S. Appl. No. 12/683,804".
"Office Action dated Jul. 16, 2007, by the USPTO, re U.S. Appl. No. 10/831,467".
"Office Action dated Jul. 16, 2012, by the USPTO, re U.S. Appl. No. 12/683,804".
"Office Action dated Jul. 28, 2008, by the USPTO, re U.S. Appl. No. 10/833,921".
"Office Action dated Jun. 1, 2016, by the USPTO, re U.S. Appl. No. 14/565,962".
"Office Action dated Jun. 24, 2009, by the USPTO, re U.S. Appl. No. 10/831,467".
"Office Action dated Mar. 8, 2016, by the USPTO, re U.S. Appl. No. 14/262,880".
"Office Action dated Mar. 9, 2012, by the USPTO, re U.S. Appl. No. 12/821,663".
"Office Action dated May 23, 2013, by the USPTO, re U.S. Appl. No. 12/683,900".
"Office Action dated May 29, 2007, by the USPTO, re U.S. Appl. No. 10/833,921".
"Office Action dated May 7, 2008, by the USPTO, re U.S. Appl. No. 10/831,467".
"Office Action dated Nov. 14, 2008, by the USPTO, re U.S. Appl. No. 10/831,467".
"Office Action dated Oct. 11, 2011, by the USPTO, re U.S. Appl. No. 12/277,849".
"Office Action dated Oct. 7, 2013, by the USPTO, re U.S. Appl. No. 13/843,525".
"Office Action dated Sep. 18, 2007, by the USPTO, re U.S. Appl. No. 10/833,921".
"Office Action dated Sep. 29, 2014, by the USPTO, re U.S. Appl. No. 13/339,640".
"SPM QEM2500 GL Well Service Plunger Pump, Generic Operation Instruction and Service Manual, May 8, 2010".
"Suction Requirements for Reciprocating Power Pumps, p. 59, Figure 3.4 Composite Pump Dynamics".
"Supplemental Notice of Allowance dated Mar. 21, 2012, by the USPTO, re U.S. Appl. No. 12/277,849".

* cited by examiner

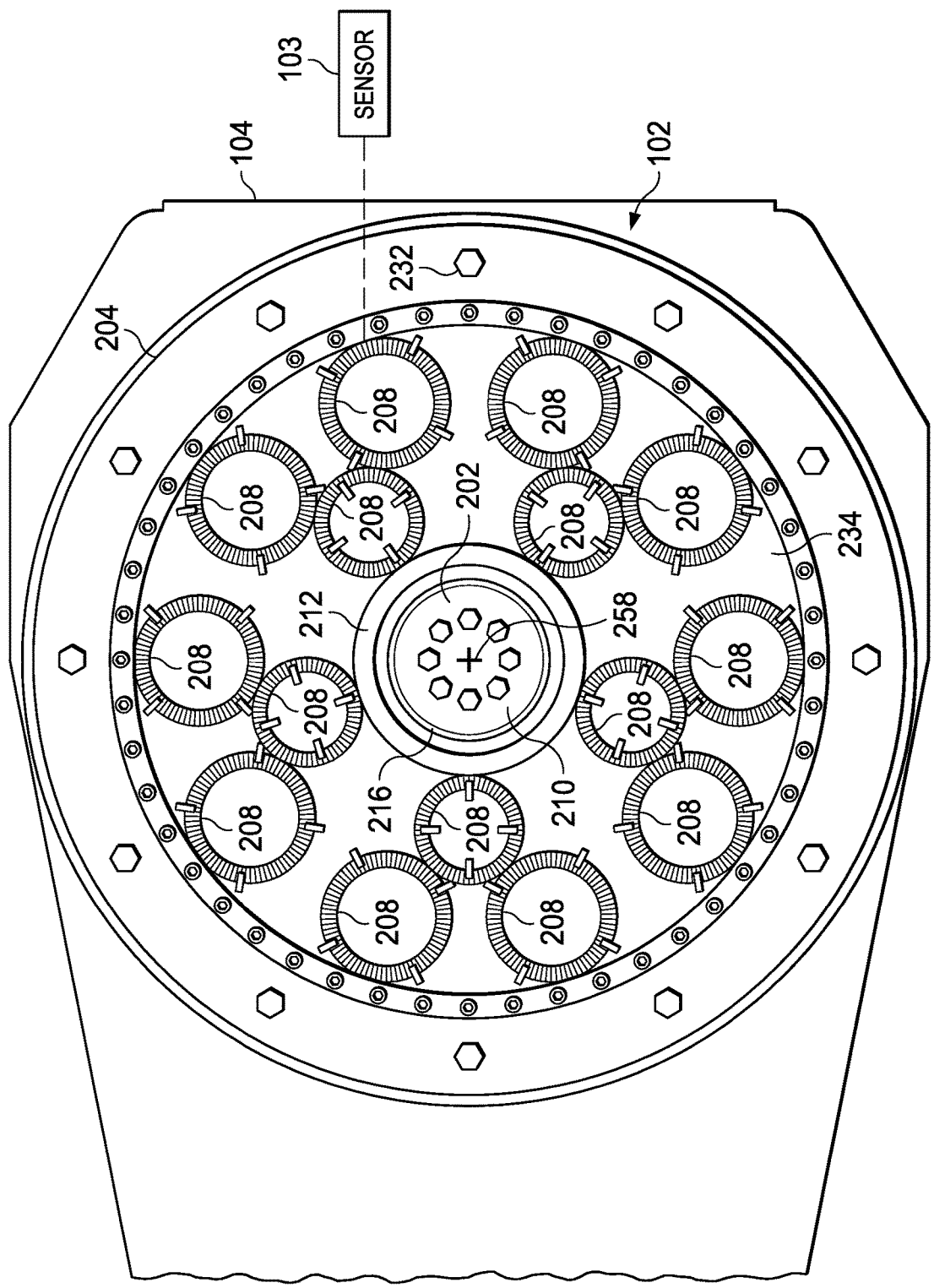

PUMP DRIVETRAIN DAMPER SYSTEM AND CONTROL SYSTEMS AND METHODS FOR SAME

RELATED APPLICATIONS

This application is a Continuation of U.S. application Ser. No. 14/752,073 filed Jun. 26, 2015, which claims the benefit of U.S. Provisional Application No. 62/018,310 filed Jun. 27, 2014 and U.S. Provisional Application No. 62/019,610 filed Jul. 1, 2014, the entire disclosures of which are hereby incorporated herein by reference.

TECHNICAL FIELD

This disclosure relates to damper systems and methods for well servicing pumps, and in particular, to damper systems and methods for reducing vibration in reciprocating pump assemblies.

BACKGROUND OF THE DISCLOSURE

During the hydraulic fracturing of a well, fluids are pumped into wellbore casing and subterranean features using reciprocating or positive displacement pumps. The pumps are typically powered by one or more engines that are coupled to the pumps through a series of components known as a pump drivetrain. The pump drivetrain can include a variety of components, such as, but not limited to, an engine output shaft or driveshaft, a transmission, one or more gear reducers, one or more drivetrain linkages and a pump crankshaft. During operation, vibration occurs in the pumps, the pump drivetrain and other equipment coupled to the pump drivetrain. Excessive vibration causes damage to the pump drivetrain and can damage the pumps and other equipment coupled to the pump drivetrain. Furthermore, such vibrations can accelerate wear on parts of the drivetrain, such as the transmission, resulting in the need to replace these parts before other parts of the pump drivetrain are ready for replacement or servicing. When components of the pump drivetrain fail, replacement components must be substituted at significant cost to well operators. In some instances, well operators plan for this type of failure by obtaining standby components, which further increases the costs of operating the well. In some cases, the pump drivetrain experiences resonance vibration, which can cause extensive damage to pump components, as well as potential hazards to nearby workers.

Dampers have been used to reduce vibrations in a pump drivetrain. For example, one or more viscous dampers are often coupled to a pump drivetrain to reduce reciprocating oscillating torque and vibrations in the pump drivetrain. However, current dampers do not adequately dampen vibrations and often do not dampen vibrations until the vibrations have gained momentum in the drivetrain. For example, current viscoelastic dampers respond to inertia already present in the pump drivetrain and have slow response times due to the fluid viscosity and tension in parts of the damper, such as the elastomer bladder. In addition, current dampers require large, heavy components to counteract vibrations in the pump drivetrain. Due to current weight limits on vehicles used to transport equipment to and from well sites, such as frac trucks, current dampers can cause the frac trucks to be overweight, thus requiring road permits for transportation of the frac equipment. In addition, current dampers containing large, heavy parts are often difficult to couple to a pump drivetrain and, when coupled to a pump assembly, are difficult to remove and service.

SUMMARY

In a first aspect, there is provided a damper control system for a reciprocating pump assembly, the damper control system comprising: at least one sensor adapted to sense at least one characteristic of the reciprocating pump assembly, the reciprocating pump assembly having opposing first and second end portions and being adapted to be operably coupled to at least one gear reducer at the first end portion; at least one processor in communication with the at least one sensor; a non-transitory computer readable medium operably coupled to the at least one processor; and a computer program stored on the non-transitory computer readable medium and executable by the at least one processor; wherein the execution of the computer program by the at least one processor is adapted to cause one or more control signals to be sent to one or more electromagnets located at the second end portion of the reciprocating pump assembly; and wherein the one or more control signals are adapted to be sent in response to the at least one processor receiving from the at least one sensor signals or data associated with the at least one characteristic of the reciprocating pump assembly.

In an exemplary embodiment, the damper control system includes a plurality of sensors of which the at least one sensor is a part; wherein the plurality of sensors are adapted to sense respective characteristics of the reciprocating pump assembly.

In another exemplary embodiment, the reciprocating pump assembly comprises a crankshaft extending between the first and second end portions, and a flywheel operably coupled to the crankshaft at the second end portion; wherein the respective characteristics of the reciprocating pump assembly comprise one or more of the following: a pressure within the reciprocating pump assembly; rotating crankshaft position; and acceleration of the flywheel.

In yet another exemplary embodiment, the damper control system includes a controller adapted to be in communication with the one or more electromagnets.

In certain exemplary embodiments, the controller comprises one or both of the at least one processor and the non-transitory computer readable medium.

In an exemplary embodiment, the damper control system includes reverse flux diodes adapted to be electrically coupled in-line between the controller and the one or more electromagnets.

In a second aspect, there is provided a method of dampening vibrations in a pump drivetrain, the pump drivetrain comprising a driveshaft, a transmission operably coupled to the driveshaft, and an engine operably coupled to the transmission. The method includes: detecting a beginning of torque variation in the pump drivetrain; sending one or more control signals to one or more electromagnets in response to detecting the beginning of the torque variation in the pump drivetrain; and negating, using the one or more electromagnets, at least a portion of the torque variation to prevent an unacceptable generation of inertia in one or more of the driveshaft, the transmission, and the engine due to the torque variation.

In an exemplary embodiment, detecting the beginning of the torque variation in the pump drivetrain comprises receiving, from one or more sensors, signals or data associated with characteristics of a reciprocating pump assembly driven by the drivetrain.

In another exemplary embodiment, detecting the beginning of the torque variation in the pump drivetrain further comprises calculating, using one or more processors and based on the sensor signals or data, torque characteristics of one or more of the reciprocating pump assembly and the engine.

In yet another exemplary embodiment, sending the one or more control signals to the one or more electromagnets comprises calculating, using the one or more processors and based on the torque characteristics, damper response voltages per degree of crank angle, wherein the one or more control signals sent to the one or more electromagnets are based on the damper response voltages per degree of crank angle.

In certain exemplary embodiments, the reciprocating pump assembly comprises a crankshaft that is part of the drivetrain, and a flywheel operably coupled to the crankshaft; and wherein the characteristics of the reciprocating pump assembly, with which the sensor signals or data are associated, comprise one or more of the following: a pressure within the reciprocating pump assembly; rotating crankshaft position; and acceleration of the flywheel.

In an exemplary embodiment, the crankshaft comprises opposing first and second end portions, the driveshaft is operably coupled to the crankshaft at the first end portion thereof, and the flywheel is operably coupled to the crankshaft at the second end portion thereof.

In a third aspect, there is provided a method of dampening vibrations, the method comprising: receiving, from one or more sensors, signals or data associated with characteristics of at least one reciprocating pump assembly; calculating, using one or more processors and based on the sensor signals or data, torque characteristics of one or more of the reciprocating pump assembly and an engine operably coupled thereto; calculating, using the one or more processors and based on the torque characteristics, damper response voltages per degree of crank angle; and sending one or more control signals to one or more electromagnets to dampen vibrations in one or more of the reciprocating pump assembly and the engine, wherein the one or more control signals are based on the damper response voltages per degree of crank angle.

In an exemplary embodiment, calculating the torque characteristics of one or more of the reciprocating pump assembly and the engine comprises calculating the torque characteristics of each of the reciprocating pump assembly and the engine.

In another exemplary embodiment, the method includes calculating correction factors and modifying responses based on the torque characteristics and the sensor signals or data; wherein the calculated damper response voltages per degree of crank angle are based on the modified responses.

In yet another exemplary embodiment, the reciprocating pump assembly comprises a flywheel to which forces are applied to dampen the vibrations in one or more of the reciprocating pump assembly and the engine, the forces being applied to the flywheel in response to sending the one or more control signals to the one or more electromagnets; and a crankshaft to which the flywheel is operably coupled; and wherein the characteristics of the reciprocating pump assembly, with which the sensor signals or data are associated, comprise one or more of the following: a pressure within the reciprocating pump assembly; rotating crankshaft position; and acceleration of the flywheel.

In certain exemplary embodiments, the crankshaft comprises opposing first and second end portions, the engine is operably coupled to the crankshaft at the first end portion thereof, and the flywheel is operably coupled to the crankshaft at the second end portion thereof.

In an exemplary embodiment, the reciprocating pump assembly further comprises a fluid end; and wherein the pressure within the reciprocating pump assembly is a discharge pressure of the fluid end of the reciprocating pump assembly.

In another exemplary embodiment, calculating the torque characteristics of one or more of the reciprocating pump assembly and the engine comprises calculating the torque characteristics of each of the reciprocating pump assembly and the engine; wherein the reciprocating pump assembly comprises: a flywheel to which forces are applied to dampen the vibrations in one or more of the reciprocating pump assembly and the engine, the forces being applied to the flywheel in response to sending the one or more control signals to the one or more electromagnets; and a crankshaft to which the flywheel is operably coupled; wherein the characteristics of the reciprocating pump assembly, with which the sensor data or signals are associated, comprise one or more of the following: a pressure within the reciprocating pump assembly; rotating crankshaft position; and acceleration of the flywheel; wherein the method further comprises calculating correction factors and modifying responses based on the torque characteristics and the sensor signals or data; and wherein the calculated damper response voltages per degree of crank angle are based on the modified responses.

In yet another exemplary embodiment, the reciprocating pump assembly comprises: a flywheel to which forces are applied to dampen the vibrations in one or more of the reciprocating pump assembly and the engine, the forces being applied to the flywheel in response to sending the one or more control signals to the one or more electromagnets; and a crankshaft to which the flywheel is operably coupled; and wherein receiving, from the one or more sensors, the signals or data associated with the characteristics of the reciprocating pump assembly comprises at least one of the following: receiving signals or data from a pressure sensor adapted to sense at least a discharge pressure of the reciprocating pump assembly; receiving signals or data from a crank position sensor adapted to sense the crank position of the crankshaft; and receiving signals or data from an accelerometer mounted on the flywheel.

In certain exemplary embodiments, calculating the torque characteristics of one or more of the reciprocating pump assembly and the engine operably coupled thereto comprises at least one of the following: calculating pump suction torque characteristics of the reciprocating pump assembly; calculating pump discharge torque characteristics of the reciprocating pump assembly; and calculating torque characteristics of the engine.

In an exemplary embodiment, at least one of the pump suction torque characteristics, the pump discharge torque characteristics, and the torque characteristics of the engine comprise torque variance relative to mean per degree of crank angle.

In another exemplary embodiment, sending the one or more control signals to the one or more electromagnets comprises at least one of the following: sending a voltage command for one or more of the electromagnets corresponding to control of low RPM in a suction portion of a pump stroke of the reciprocating pump assembly; sending a voltage command for one or more of the electromagnets corresponding to control of low RPM in the reciprocating pump assembly; and sending a voltage command for one or more of the electromagnets corresponding to control of high RPM in a driveline that drives the reciprocating pump assembly.

In yet another exemplary embodiment, the respective voltage commands are sent to a controller operably coupled to the one or more electromagnets.

In certain exemplary embodiments, the method includes calculating correction factors and modifying responses based on the torque characteristics and the sensor signals or data; wherein the calculated damper response voltages per degree of crank angle are based on the modified responses; and wherein calculating the correction factors and modifying the responses based on the torque characteristics and the sensor signals or data comprises at least one of the following: calculating a first correction factor using at least pump suction torque characteristics of the reciprocating pump assembly; calculating a second correction factor using at least pump discharge torque characteristics of the reciprocating pump assembly; and calculating a third correction factor using at least torque characteristics of the engine.

In an exemplary embodiment, at least one of the pump suction torque characteristics, the pump discharge torque characteristics, and the torque characteristics of the engine comprises torque variance relative to mean per degree of crank angle.

In a fourth aspect, there is provided a damper system for a fluid pump, the damper system comprising: a housing defining a fluid chamber, the fluid chamber configured to receive a magnetorheological fluid therein; a flywheel disposed at least partially within the fluid chamber and adapted to be operably coupled to a crankshaft of the fluid pump; and a magnetic device secured to the housing and positioned proximate to the flywheel; wherein the magnetic device applies a variable drag force to the flywheel to reduce vibration in the fluid pump when the magnetorheological fluid is received in the fluid chamber, the flywheel is operably coupled to the crankshaft, and the magnetic device is energized.

In an exemplary embodiment, the flywheel is adapted to rotate with the crankshaft of the pump assembly when the flywheel is operably coupled to the crankshaft.

In another exemplary embodiment, the flywheel comprises: a central portion adapted to be secured to the crankshaft, and a flanged portion surrounding the central portion, the flanged portion comprising a first surface, a second surface positioned opposite from the first surface, and an outside edge located between the first surface and the second surface.

In yet another exemplary embodiment, a first portion of the fluid chamber is located between the first surface of the flanged portion and a first inner surface of the housing and a second portion of the fluid chamber is located between the second surface of the flanged portion and a second inner surface of the housing so that, when the magnetorheological fluid is received in the fluid chamber, the magnetorheological fluid contacts at least part of the first surface and the second surface of the flywheel.

In certain exemplary embodiments, a third portion of the fluid chamber is located between the outside edge of the flanged portion and a third inner surface of the housing extending between the first inner surface and the second inner surface of the housing so that, when the magnetorheological fluid is received in the fluid chamber, the magnetorheological fluid contacts at least part of the outside edge of the flywheel.

In an exemplary embodiment, the magnetic device comprises a first plurality of electromagnets proximate to the first side of the flanged portion and a second plurality of electromagnets proximate to a second side of the flanged portion.

In another exemplary embodiment, the magnetic device comprises a first plurality of electromagnets proximate to at least one of the first side and the second side of the flanged portion.

In yet another exemplary embodiment, the flywheel comprises at least one of the following: a roughened surface texture on the first and second surfaces of the flanged portion; a roughened surface texture on the outside edge of the flanged portion; and a plurality of openings in the flanged portion.

In certain exemplary embodiments, the flywheel is circular.

In an exemplary embodiment, the damper system includes a first plurality of permanent magnets connected to the housing, the first plurality of magnets having respective first poles; and a second plurality of permanent magnets either connected to the flywheel or adapted to be connected to the crankshaft, the second plurality of permanent magnets having respective second poles; wherein each of the respective first poles is adapted to interact with a corresponding one of the respective second poles.

In a fifth aspect, there is provided a method of dampening vibrations in a fluid pump drivetrain, the method comprising receiving a first signal from a sensor in response sensing a characteristic of the fluid pump drivetrain; sending a second signal to an electromagnet in response to receiving the first signal; and varying a charge of the electromagnet in response to the electromagnet receiving the second signal to generate a magnetic field to vary a characteristic of a magnetorheological fluid disposed in a fluid chamber, wherein in response to varying the charge, the magnetorheological fluid applies a force to a flywheel disposed at least partially within the fluid chamber.

In an exemplary embodiment, applying a force to the flywheel comprises applying a force to at least one of a first side surface of the flywheel and a second side surface of the flywheel opposite from the first side surface.

In another exemplary embodiment, applying a force to the flywheel comprises applying respective forces to both of the first and second side surfaces of the flywheel.

In yet another exemplary embodiment, applying a force to the flywheel further comprises applying a force to an outside edge of the flywheel that extends between the first side surface and the second side surface.

In a sixth aspect, there is provided a fluid pump assembly that includes a drivetrain; a flywheel secured to the drivetrain; a housing, the housing defining a fluid chamber within which the flywheel is at least partially disposed; a magnetorheological fluid disposed in the fluid chamber; and an electromagnetic device secured to the housing and positioned proximate to the flywheel; wherein the electromagnetic device, when energized, changes a characteristic of the magnetorheological fluid to vary a force acting on the flywheel.

In an exemplary embodiment, the fluid pump assembly includes at least one sensor to sense at least one characteristic of the drivetrain.

In another exemplary embodiment, the electromagnetic device is selectively engaged in response to electrical signals generated by the sensor.

In yet another exemplary embodiment, the drivetrain comprises a crankshaft, and wherein the fluid pump assembly further comprises: a first plurality of permanent magnets connected to the housing, the first plurality of magnets having respective first poles; and a second plurality of permanent magnets, each of the permanent magnets in the second plurality of permanent magnets being connected to either the flywheel or the crankshaft, the second plurality of permanent magnets having respective second poles; wherein each of the respective first poles is adapted to interact with a corresponding one of the respective second poles.

In a seventh aspect, there is provide an apparatus adapted to dampen vibrations in a fluid pump drivetrain, the fluid pump drivetrain comprising a power source, one or more gear reducers operably coupled to the power source, and a crankshaft comprising opposing first and second end portions, the first end portion of the crankshaft being operably coupled to the one or more gear reducers, the apparatus comprising: a non-transitory computer readable medium; and a plurality of instructions stored on the non-transitory computer readable medium and executable by one or more processors, the plurality of instructions comprising: instructions that cause the one or more processors to receive a first signal from a sensor in response to sensing a characteristic of the fluid pump drivetrain; and instructions that, in response to receiving the first signal, cause the one or more processors to send a second signal to an electromagnet positioned proximate the second end portion of the crankshaft to vary a charge of the electromagnet to vary a characteristic of a magnetorheological fluid positioned proximate the second end portion of the crankshaft so that the magnetorheological fluid applies a force to a flywheel to dampen the vibrations in the fluid pump drivetrain.

In an exemplary embodiment, the sensed characteristic of the fluid pump drivetrain comprises at least one of the following: crankshaft RPM; driveshaft torque; rotating crankshaft position; one or more temperatures; and one or more pressures.

In another exemplary embodiment, the plurality of instructions further comprises instructions that cause the one or more processors to collect data concerning the fluid pump drivetrain.

In yet another exemplary embodiment, the plurality of instructions further comprises instructions that cause the one or more processors to compile the collected data to predict future vibrations.

In an eighth aspect, there is provided an apparatus that includes a non-transitory computer readable medium; and a plurality of instructions stored on the non-transitory computer readable medium and executable by one or more processors, the plurality of instructions comprising: instructions that cause the one or more processors to receive, from one or more sensors, signals or data associated with characteristics of at least one reciprocating pump assembly; instructions that cause the one or more processors to calculate, based on the sensor signals or data, torque characteristics of one or more of the reciprocating pump assembly and an engine operably coupled thereto; instructions that cause the one or more processors to calculate, based on the torque characteristics, damper response voltages per degree of crank angle; and instructions that cause the one or more processors to send one or more control signals to one or more electromagnets to dampen vibrations in one or more of the reciprocating pump assembly and the engine, wherein the one or more control signals are based on the damper response voltages per degree of crank angle.

In an exemplary embodiment, the instructions that cause the one or more processors to calculate the torque characteristics of one or more of the reciprocating pump assembly and the engine comprise instructions that cause the one or more processors to calculate the torque characteristics of each of the reciprocating pump assembly and the engine.

In another exemplary embodiment, the plurality of instructions further comprises instructions that cause the one or more processors to calculate correction factors and modify responses based on the torque characteristics and the sensor signals or data; wherein the calculated damper response voltages per degree of crank angle are based on the modified responses.

In yet another exemplary embodiment, the reciprocating pump assembly comprises: a flywheel to which forces are applied to dampen the vibrations in one or more of the reciprocating pump assembly and the engine, the forces being applied to the flywheel in response to sending the one or more control signals to the one or more electromagnets; and a crankshaft to which the flywheel is operably coupled; and wherein the characteristics of the reciprocating pump assembly, with which the sensor signals or data are associated, comprise one or more of the following: a pressure within the reciprocating pump assembly; rotating crankshaft position; and acceleration of the flywheel.

In certain exemplary embodiments, the crankshaft comprises opposing first and second end portions, the engine is operably coupled to the crankshaft at the first end portion thereof, and the flywheel is operably coupled to the crankshaft at the second end portion thereof.

In an exemplary embodiment, the reciprocating pump assembly further comprises a fluid end; and wherein the pressure within the reciprocating pump assembly is a discharge pressure of the fluid end of the reciprocating pump assembly.

In another exemplary embodiment, the instructions that cause the one or more processors to calculate the torque characteristics of one or more of the reciprocating pump assembly and the engine comprise instructions that cause the one or more processors to calculate the torque characteristics of each of the reciprocating pump assembly and the engine; wherein the reciprocating pump assembly comprises: a flywheel to which forces are applied to dampen the vibrations in one or more of the reciprocating pump assembly and the engine, the forces being applied to the flywheel in response to sending the one or more control signals to the one or more electromagnets; and a crankshaft to which the flywheel is operably coupled; wherein the characteristics of the reciprocating pump assembly, with which the sensor data or signals are associated, comprise one or more of the following: a pressure within the reciprocating pump assembly; rotating crankshaft position; and acceleration of the flywheel; wherein the plurality of instructions further comprises instructions that cause the one or more processors to calculate correction factors and modify responses based on the torque characteristics and the sensor signals or data; and wherein the calculated damper response voltages per degree of crank angle are based on the modified responses.

In yet another exemplary embodiment, the reciprocating pump assembly comprises: a flywheel to which forces are applied to dampen the vibrations in one or more of the reciprocating pump assembly and the engine, the forces being applied to the flywheel in response to sending the one or more control signals to the one or more electromagnets; and a crankshaft to which the flywheel is operably coupled; and wherein the instructions that cause the one or more processors to receive, from the one or more sensors, the signals or data associated with the characteristics of the reciprocating pump assembly comprise at least one of the following: instructions that cause the one or more processors to receive signals or data from a pressure sensor adapted to sense at least a discharge pressure of the reciprocating pump assembly; instructions that cause the one or more processors to receive signals or data from a crank position sensor adapted to sense the crank position of the crankshaft; and instructions that cause the one or more processors to receive signals or data from an accelerometer mounted on the flywheel.

In certain exemplary embodiments, the instructions that cause the one or more processors to calculate the torque characteristics of one or more of the reciprocating pump assembly and the engine operably coupled thereto comprise at least one of the following: instructions that cause the one or more processors to calculate pump suction torque characteristics of the reciprocating pump assembly; instructions that cause the one or more processors to calculate pump discharge torque characteristics of the reciprocating pump assembly; and instructions that cause the one or more processors to calculate torque characteristics of the engine.

In an exemplary embodiment, at least one of the pump suction torque characteristics, the pump discharge torque characteristics, and the torque characteristics of the engine comprise torque variance relative to mean per degree of crank angle.

In another exemplary embodiment, the instructions that cause the one or more processors to send the one or more control signals to the one or more electromagnets comprise at least one of the following: instructions that cause the one or more processors to send a voltage command for one or more of the electromagnets corresponding to control of low RPM in a suction portion of a pump stroke of the reciprocating pump assembly; instructions that cause the one or more processors to send a voltage command for one or more of the electromagnets corresponding to control of low RPM in the reciprocating pump assembly; and instructions that cause the one or more processors to send a voltage command for one or more of the electromagnets corresponding to control of high RPM in a driveline that drives the reciprocating pump assembly.

In yet another exemplary embodiment, the respective voltage commands are sent to a controller operably coupled to the one or more electromagnets.

In certain exemplary embodiments, the plurality of instructions further comprises instructions that cause the one or more processors to calculate correction factors and modify responses based on the torque characteristics and the sensor signals or data; wherein the calculated damper response voltages per degree of crank angle are based on the modified responses; and wherein the instructions that cause the one or more processors to calculate the correction factors and modify the responses based on the torque characteristics and the sensor signals or data comprise at least one of the following: instructions that cause the one or more processors to calculate a first correction factor using at least pump suction torque characteristics of the reciprocating pump assembly; instructions that cause the one or more processors to calculate a second correction factor using at least pump discharge torque characteristics of the reciprocating pump assembly; and instructions that cause the one or more processors to calculate a third correction factor using at least torque characteristics of the engine.

In an exemplary embodiment, at least one of the pump suction torque characteristics, the pump discharge torque characteristics, and the torque characteristics of the engine comprises torque variance relative to mean per degree of crank angle.

In a ninth aspect, there is provided an apparatus adapted to dampen vibrations in a pump drivetrain, the pump drivetrain comprising a driveshaft, a transmission operably coupled to the driveshaft, and an engine operably coupled to the transmission, the apparatus comprising: a non-transitory computer readable medium; and a plurality of instructions stored on the non-transitory computer readable medium and executable by one or more processors, the plurality of instructions comprising: instructions that cause the one or more processors to detect a beginning of torque variation in a pump drivetrain; and instructions that cause the one or more processors, in response to detecting the beginning of the torque variation in the pump drivetrain, to send one or more control signals to one or more electromagnets to negate at least a portion of the torque variation to prevent an unacceptable generation of inertia in one or more of the driveshaft, the transmission, and the engine due to the torque variation.

In an exemplary embodiment, the instructions that cause the one or more processors to detect the beginning of the torque variation in the pump drivetrain comprise instructions that cause the one or more processors to receive, from one or more sensors, signals or data associated with characteristics of a reciprocating pump assembly driven by the drivetrain.

In another exemplary embodiment, the instructions that cause the one or more processors to detect the beginning of the torque variation in the pump drivetrain further comprise instructions that cause the one or more processors to calculate, based on the sensor signals or data, torque characteristics of one or more of the reciprocating pump assembly and the engine.

In yet another exemplary embodiment, the instructions that cause the one or more processors to send the one or more control signals to the one or more electromagnets comprise instructions that cause the one or more processors to calculate, based on the torque characteristics, damper response voltages per degree of crank angle, wherein the one or more control signals sent to the one or more electromagnets are based on the damper response voltages per degree of crank angle.

In certain exemplary embodiments, the reciprocating pump assembly comprises a crankshaft that is part of the drivetrain, and a flywheel operably coupled to the crankshaft; and wherein the characteristics of the reciprocating pump assembly, with which the sensor signals or data are associated, comprise one or more of the following: a pressure within the reciprocating pump assembly; rotating crankshaft position; and acceleration of the flywheel.

In an exemplary embodiment, the crankshaft comprises opposing first and second end portions, the driveshaft is operably coupled to the crankshaft at the first end portion thereof, and the flywheel is operably coupled to the crankshaft at the second end portion thereof.

In a tenth aspect, there is provided a reciprocating pump assembly that includes a power end housing and a fluid end housing; a plunger; a drivetrain for reciprocating the plunger between the power end housing and the fluid end housing; a damper system, the damper system comprising: a stationary housing defining a fluid chamber, the fluid chamber configured to receive a magnetorheological fluid therein; a flywheel disposed at least partially within the fluid chamber; and a magnetic device secured to the housing and positioned proximate to the flywheel, the magnetic device, when energized, applies a variable drag force to the flywheel to reduce vibration in the fluid pump.

In an exemplary embodiment, the stationary housing is secured to the power end housing.

In another exemplary embodiment, the flywheel is secured to a crankshaft for rotation therewith.

In yet another exemplary embodiment, the reciprocating pump assembly includes at least one sensor to sense at least one characteristic of a pump drivetrain.

In certain exemplary embodiments, the magnetic device is selectively engaged in response to electrical signals generated by the sensor.

In an exemplary embodiment, the flywheel is a circular disk-like member.

In an eleventh aspect, there is provided a reciprocating pump assembly having opposing first and second end portions, the reciprocating pump assembly comprising: a crankshaft housing adapted to be operably coupled to at least one gear reducer at the first end portion of the reciprocating pump assembly; a fluid end coupled to the crankshaft housing; a crankshaft extending within the crankshaft housing and between the first and second end portions of the reciprocating pump assembly; a plurality of plungers operably coupled to the crankshaft and adapted to reciprocatingly move toward and away from the fluid end; a flywheel operably coupled to the crankshaft at the second end portion of the reciprocating pump assembly; one or more electromagnets proximate the flywheel; a controller in communication with the one or more electromagnets; and a plurality of sensors in communication with the controller; wherein the controller is adapted to receive from the plurality of sensors signals or data associated with characteristics of the reciprocating pump assembly; and wherein, in response to receiving the signals or data associated with the characteristics of the reciprocating pump assembly, the controller is adapted to send one or more control signals to the one or more electromagnets to apply forces to the flywheel to dampen vibration.

In an exemplary embodiment, the characteristics of the reciprocating pump assembly, with which the sensor signals or data are associated, comprise one or more of the following: a pressure within the reciprocating pump assembly; rotating crankshaft position; and acceleration of the flywheel.

In another exemplary embodiment, the controller comprises at least one processor; a non-transitory computer readable medium operably coupled to the at least one processor; and a plurality of instructions stored on the non-transitory computer readable medium and executable by the at least one processor; wherein, when the plurality of instructions are executed by the at least one processor, the one or more control signals are sent to the one or more electromagnets in response to the receipt of the signals or data associated with the characteristics of the reciprocating pump assembly.

In yet another exemplary embodiment, the reciprocating pump assembly includes reverse flux diodes electrically coupled in-line between the controller and the one or more electromagnets.

In a twelfth aspect, there is provided a reciprocating pump assembly having opposing first and second end portions, the reciprocating pump assembly comprising: a crankshaft housing adapted to be operably coupled to at least one gear reducer at the first end portion of the reciprocating pump assembly; a fluid end coupled to the crankshaft housing; a crankshaft extending within the crankshaft housing and between the first and second end portions of the reciprocating pump assembly; a plurality of plungers operably coupled to the crankshaft and adapted to reciprocatingly move toward and away from the fluid end; a flywheel operably coupled to the crankshaft at the second end portion of the reciprocating pump assembly; one or more electromagnets proximate the flywheel; and a damper control system, comprising: a pressure sensor operably coupled to the fluid end; a crank position sensor operably coupled to the crankshaft; an accelerometer operably coupled to the flywheel; at least one processor in communication with the pressure sensor, the crank position sensor, and the accelerometer; a non-transitory computer readable medium operably coupled to the at least one processor; and a computer program stored on the non-transitory computer readable medium and executable by the at least one processor; wherein the execution of the computer program by the at least one processor is adapted to cause one or more control signals to be sent to the one or more electromagnets; and wherein the one or more control signals are adapted to be sent in response to the at least one processor receiving, from the pressure sensor, the crank position sensor, and the accelerometer, signals or data associated with the characteristics of the reciprocating pump assembly.

Other aspects, features, and advantages will become apparent from the following detailed description when taken in conjunction with the accompanying drawings, which are part of this disclosure and which illustrate, by way of example, principles of the inventions disclosed.

DESCRIPTION OF THE FIGURES

The accompanying drawings facilitate an understanding of the various embodiments.

FIG. 4 is a section view taken along viewing line 4-4 of FIG. 1 showing an embodiment of a pump drivetrain damper system with a plurality of magnetic devices in accordance with this disclosure.

DETAILED DESCRIPTION

Figure 1:
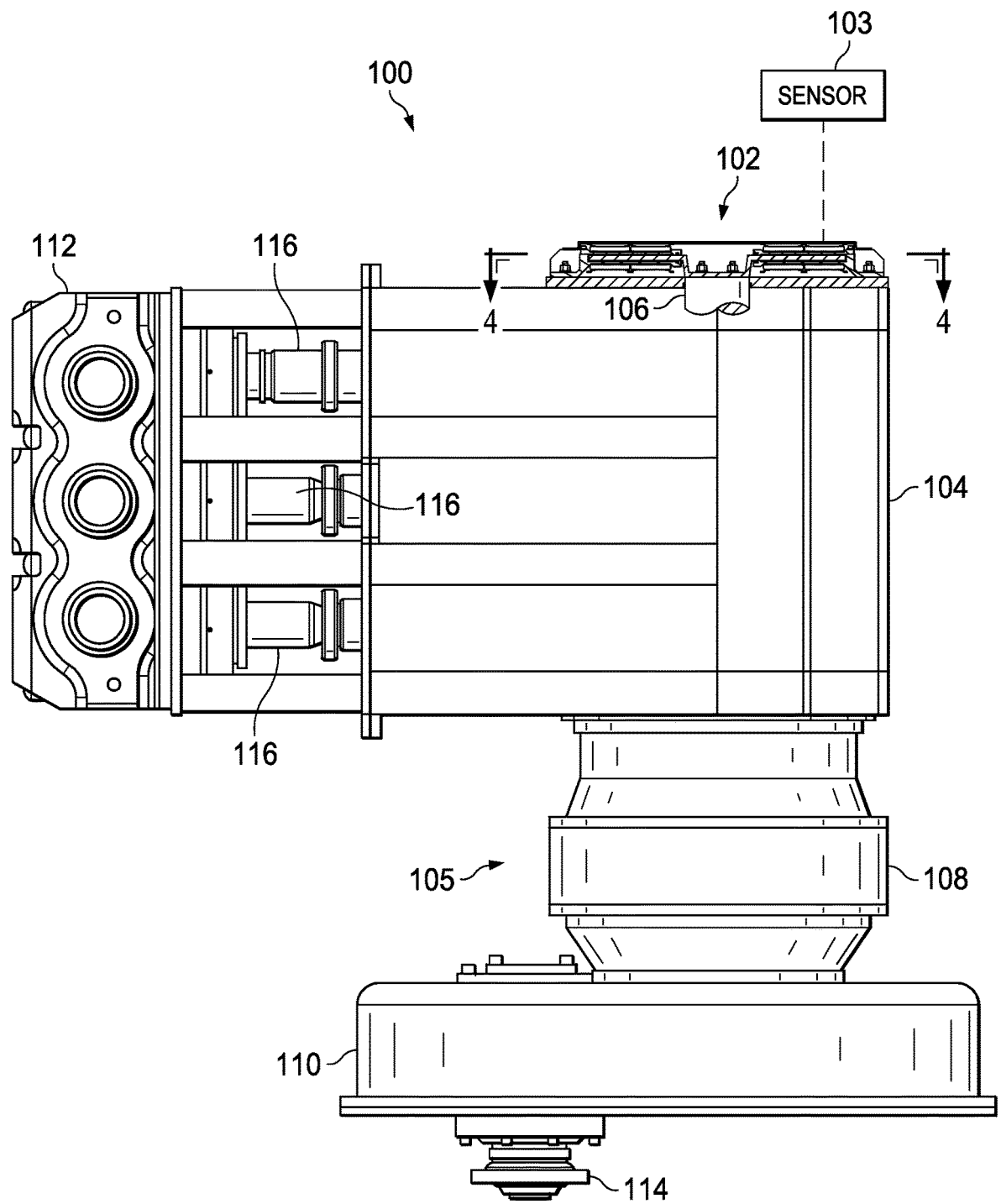
FIG. 1 is a top plan view of a fluid pump coupled to gear reducers and an input flange, and further coupled to a damper system shown in cross-section, in accordance with this disclosure.

FIG. 1 illustrates an embodiment of a reciprocating pump assembly 100 having a damper system 102 to reduce vibrations in the pump assembly 100 and an associated pump drivetrain 105. In the embodiment illustrated in FIG. 1, the reciprocating pump assembly 100 includes a power end or crankshaft housing 104, a fluid end housing 112, and a plurality of plungers 116 reciprocatingly movable toward and away from fluid end housing 112. In operation, a motor (not illustrated) rotates a crankshaft 106 disposed within the power end housing 104 to facilitate the reciprocating movement of the plungers 116. In one embodiment, the crankshaft 106 is cammed so that each respective plunger 116 reciprocates at alternating times, which helps minimize the primary, secondary, tertiary, etc. forces associated with the reciprocating pump assembly 100.

In the embodiment illustrated in FIG. 1, the reciprocating pump assembly 100 is coupled to the pump drivetrain 105 that includes gear reducers 108 and 110 to reduce the output from a drive source (e.g., a diesel engine), which is coupleable to an input flange 114. Put another way, a pump drivetrain 105 is the series of linkages and components between a power source, such as an engine (not shown), and the pump assembly 100, and includes components of the pump assembly 100 that are linked, either directly or indirectly, to the power source, such as the pump crankshaft 106. During operation, vibration generated by the pump assembly 100 and associated equipment oftentimes damages the pump assembly 100 if such vibrations are not controlled. In some instances, vibrations may escalate to a resonance frequency, which accelerate damage to pump components and in some instances, pose a danger to nearby workers. The damper system 102 is configured to reduce vibrations in the pump assembly 100, the pump drivetrain 105, and other equipment (i.e., piping, diesel engines, etc.) used in conjunction with the pump assembly 100. In the embodiment illustrated in FIGS. 1 and 2, for example, the damper system 102 couples directly to the pump driveshaft 106 to exert forces on a flywheel 202 (shown in FIG. 2), which are then transferred directly to the pump drivetrain 105. According to embodiments disclosed herein, the damper system 102 is coupled to or is otherwise integral with the reciprocating pump assembly 100 and is designed to provide a compact and lightweight damper solution in view of current damper designs. In some embodiments, the damper system 102 is electronically controllable in response to real-time sensor signals received from one or more sensors 103 positioned at various locations, such as on the pump assembly 102, throughout the pump drivetrain 105, on one or more other pump assemblies, and/or other locations at the well site. As such, the damper system 102 is responsive to vibrations from a variety of sources, such as other pumps, the wellbore, the pump drivetrain 105, the fluid pipes, and other sources.

In the embodiment illustrated in FIG. 1, the damper system 102 is coupled directly to the pump housing 104, although in other embodiments, the damper system 102 is otherwise mounted, such as, for example, within the pump housing 104, between the pump assembly 100 and the gear reducer 108, or between the reducers 108 and 110. Furthermore, while a single damper system 102 is shown in the embodiment illustrated in FIG. 1, in other embodiments, the drivetrain 105 includes more than one damper system 102.

Figure 2:
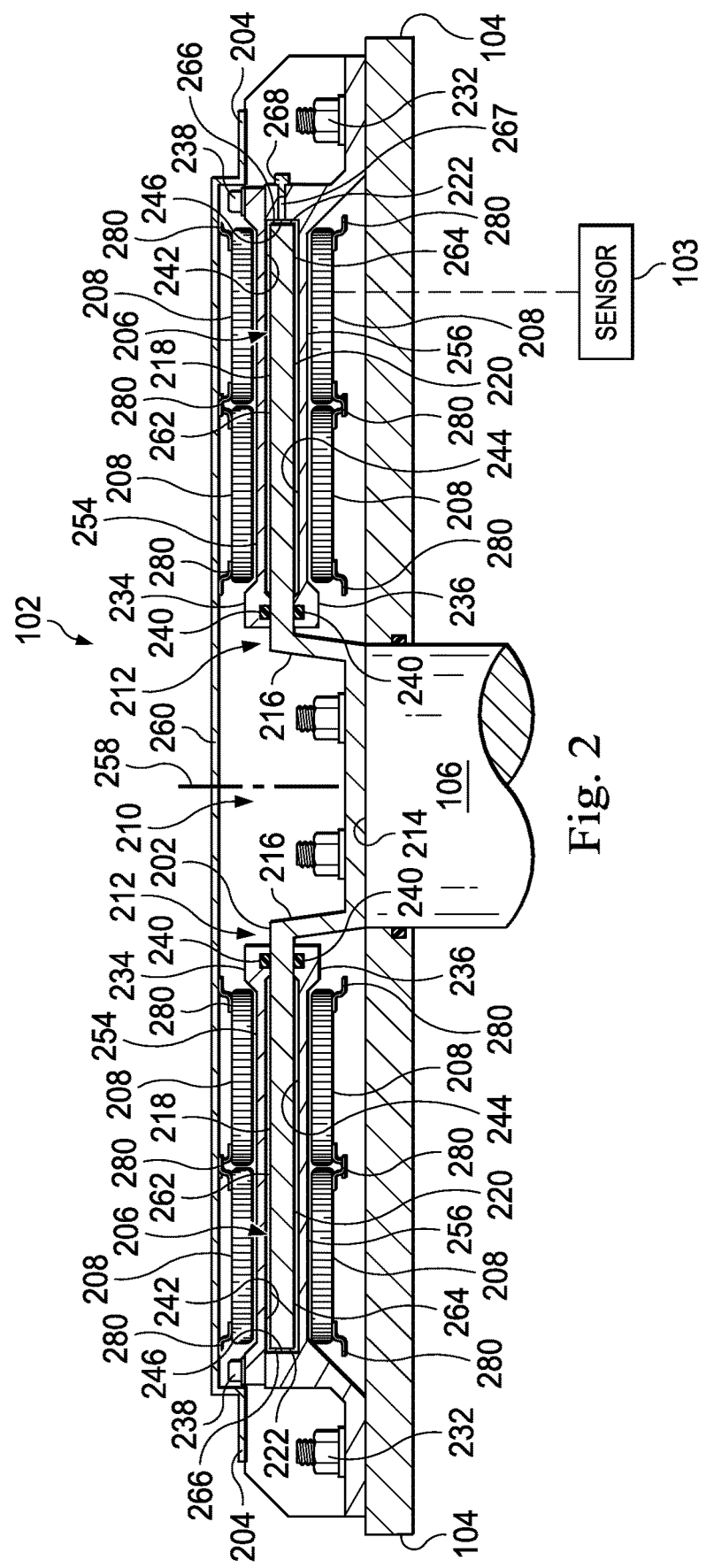
FIG. 2 is a cross-sectional side view of an embodiment of a damper system coupled to a crankshaft of a fluid pump in accordance with this disclosure.

Referring to FIGS. 2 through 4 with continuing reference to FIG. 1, the damper system 102 includes the flywheel 202, and a damper housing 204 coupled to the power end housing 104 and defining a fluid chamber 206. The flywheel 202 is disposed within the fluid chamber 206. One or more magnetic devices 208 are located, or positioned, proximate to the flywheel 202. In the embodiment illustrated in FIGS. 2 and 4, the flywheel 202 is circular in shape and includes a central portion 210 surrounded by a flanged portion 212. As shown in FIG. 2, the central portion 210 is couplable to a "blind side" or end 214 of the crankshaft 106 of the reciprocating pump assembly 100 so that the flywheel 202 rotates with the crankshaft 106, although, as discussed above, in other embodiments the flywheel 202 is coupleable to other portions of the reciprocating pump assembly 100 and in particular, other portions of the pump drivetrain 105. However, because damaging oscillating torque vibrations are produced by the pump assembly 100, coupling the flywheel 202 to the "blind side" or end 214 of the crankshaft 106 allows the damper system 102 to dampen vibrations from the fluid end 112 of the pump assembly 100 before the vibrations travel through the pump drivetrain 105. In addition, the vibrations are dampened before the vibrations are enhanced by the interaction of rotating parts of the pump drivetrain 105, such as vibration enhancement caused by the mass moment of inertia variations and mass elastic properties of the drivetrain 105, which causes accelerations and deaccelerations of the components between the rotating crankshaft 106 and the rotating driveshaft, transmission, and diesel rotating components (not shown). In addition, coupling the flywheel 202 to the "blind side" or end 214 of the crankshaft 106 allows for dampening of oscillating torque using less energy than other damper systems that may be located at other positions on the drivetrain 105 because the damper system 102 dampens vibrations at the beginning moment of an increase in torque or a decrease in torque, depending on the direction of motion of the pump plungers 116, rather than after the vibrations have picked up inertia due to the elasticity of the rotating parts of the drivetrain 105. Thus, the damper system 102 can prevent oscillating torque rather than dampening the torque after the torque has travelled through the drivetrain 105. The reduced energy requirements for the damper system 102 also allow for the damper system 102 to include lighter weight components, such as a lighter weight flywheel 202, than other damper systems. In addition, coupling the flywheel 202 to the "blind side" or end 214 of the crankshaft 106 allows for the flywheel 202 to rotate at a lower RPM, as the crankshaft 106 typically rotates at a lower RPM than other components of the pump drivetrain 105. This allows for increased response accuracy of the damper system 102.

Figure 3A:
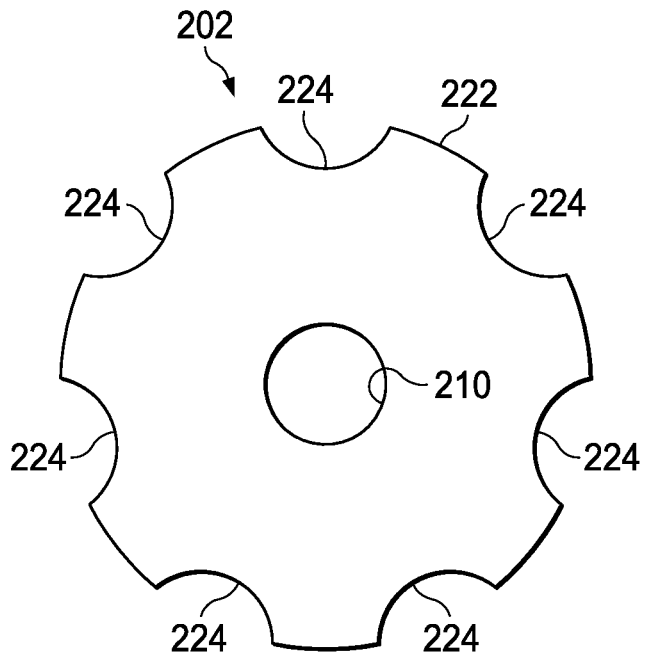
FIG. 3A is an axial view of an embodiment of a flywheel in accordance with this disclosure.
Figure 3B:
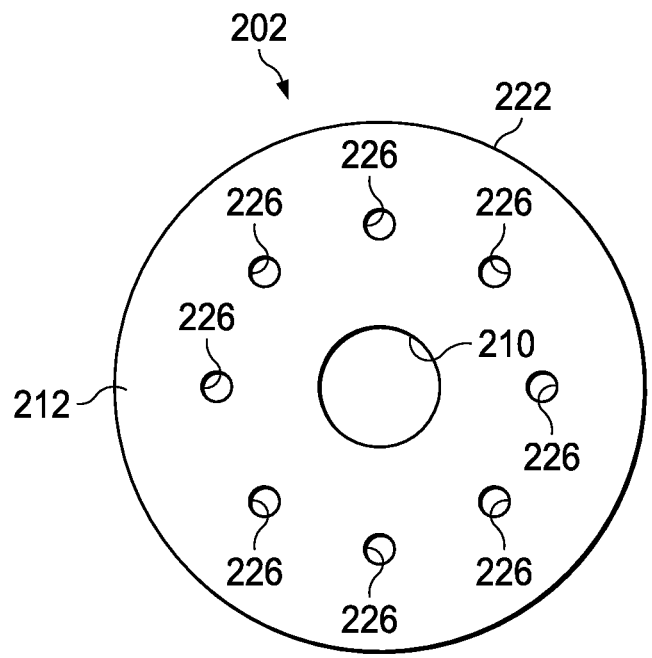
FIG. 3B is an axial view of another embodiment of a flywheel in accordance with this disclosure.
Figure 3C:
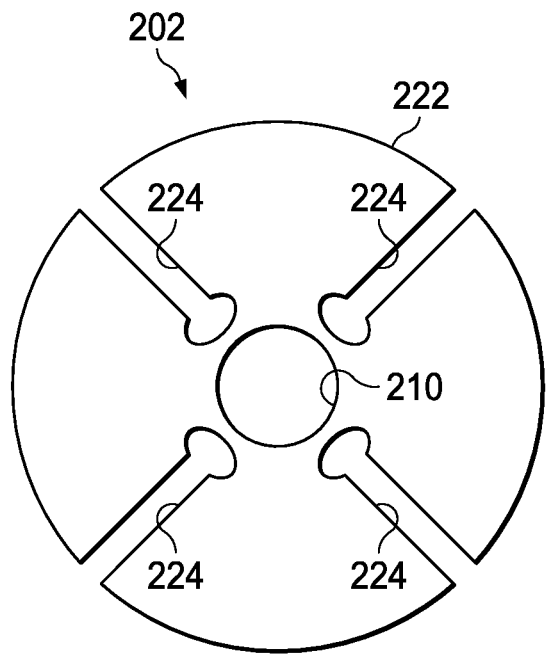
FIG. 3C is an axial view of yet another embodiment of a flywheel in accordance with this disclosure.
Figure 3D:
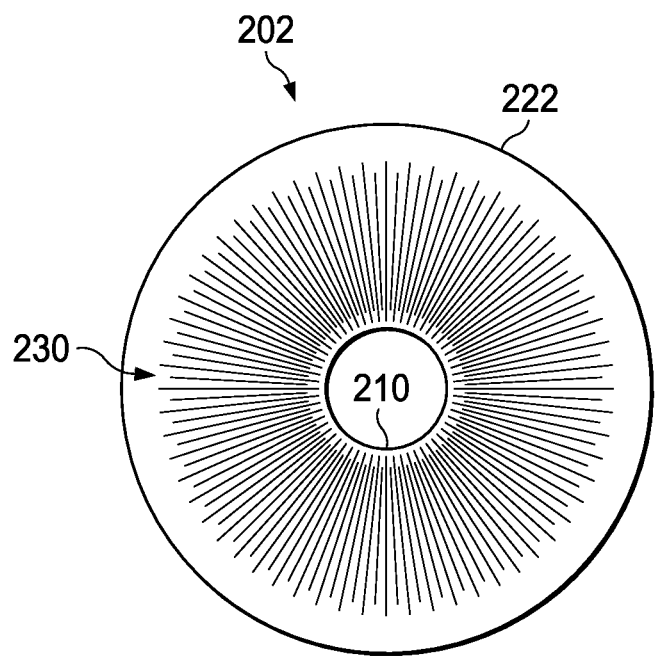
FIG. 3D is an axial view of still another embodiment of a flywheel in accordance with this disclosure.

The flanged portion 212 of the flywheel 202 extends outward from the central portion 210 and is spaced from the central portion 210 by a shoulder 216. While the flywheel 202 includes the shoulder 216 in the embodiment illustrated in FIG. 2, in other embodiments the flywheel 202 is otherwise configured, such as a flat disk-like configuration without the shoulder 216 so that the central portion 210 and the flange portion 212 are on the same plane. In other embodiments, such as the embodiment illustrated in FIG. 3A, the flywheel 202 includes recesses 224 in the outside edge 222 of the flywheel 202. In other embodiments, the flywheel 202 includes openings 226 in the flanged portion 212, as illustrated in FIG. 3B. In still other embodiments, the flywheel 202 includes channels 224 extending from the outside edge 222 toward the central portion 210, as illustrated in FIG. 3C. In further embodiments, such as the embodiment illustrated in FIG. 3D, the flywheel 202 includes surface texturing/abrasions 230. In yet other embodiments, the flywheel 202 includes other features or a combination of any of the foregoing to allow the flywheel 202 to more effectively interact with a magnetorheological fluid, as described in greater detail below. In some embodiments, the flywheel 202 is formed of a magnetic material, such as a ferrous metal or mixture of ferrous metals such as cast iron and steel. While the embodiment of the damper system 102 in FIGS. 1, 2, 4, 5 and 6 include a single flywheel 202, in other embodiments the damper system 102 includes more than one flywheel 202 to allow for increased dampening forces to be applied to the drivetrain 105. In some embodiments, one or more additional flywheels (not shown) are coupled to and rotate with the flywheel 202 and are housed at least partially within the damper housing 204.

In the embodiment illustrated in FIG. 2, the housing 204 of the damper system 102 surrounds the flywheel 202 and is secured to the pump housing 104 by way of one or more bolts 232. As such, the damper housing 204 is stationary with respect to the flywheel 202 and the crankshaft 106. In FIG. 2, the damper housing 204 includes a first annular extension 234 and a parallel and spaced apart second annular extension 236 forming the fluid chamber 206 to receive at least a portion of the flywheel 202. As illustrated in the embodiment shown in FIG. 2, the first annular extension 234 is located proximate to a first side 218 of the flanged portion 212 of the flywheel 202 and the second annular extension 236 is located proximate to a second side 220 of the flanged portion 212 of the flywheel 202 so that at least part of the flanged portion 212 is located between the first and second extensions 234 and 236. In some embodiments, the first extension 234 is integral with the second extension 236 while in other embodiments the first extension 234 is coupled to the second extension 236 by one or more bolts 238, as shown in FIG. 2. The first extension 234 and the second extension 236 are spaced from the first and second sides 218 and 220 of the flanged portion 212, respectively, so that the flywheel 202 is rotatable within the damper housing 204. The first and second extensions 234 and 236 each include a seal 240, such as an O-ring, to form a seal between the first and second extensions 234 and 236 with the first and second sides 218 and 220, respectively, of the flange portion 212.

As illustrated in FIG. 2, the fluid chamber 206 is annular in shape and, in some embodiments, has a U-shaped fluid-filled portion when the flywheel 202 is located within the fluid chamber 206. As such, when the flywheel 202 is located within the fluid chamber 206, a first portion 262 of the fluid chamber 206 extends between the first side 218 of the flanged portion 212 and a first inner surface 242 of the first extension 234, and a second portion 264 of the fluid chamber 206 extends between the second side 220 of the flanged portion 212 and a second inner surface 244 of the second extension 236. In FIG. 2, a third portion 266 of the fluid chamber 206 also extends between the outside edge 222 of the flanged portion 212 and a side edge 246 of the housing 204. Thus, when the fluid chamber 206 is filled with a fluid, the fluid is in direct contact with the first side 218, the second side 220 and the outside edge 222 of the flanged portion 212 of the flywheel 202 so that forces applied by the fluid in the fluid chamber 206 act on the first side 218, the second side 220, and the outside edge 222 of the flanged portion 212 of the flywheel 202, as will be described in more detail below. In some embodiments, the fluid chamber 206 is sealed by contact between the seals 240 and the flywheel 202 so that fluid is retained in the fluid chamber 206 and prevented from leaking towards the central portion 210 of the flywheel 202. In some embodiments, the damper housing 204 includes a fluid inlet 267 enclosed by a plug 268 to facilitate insertion within and removal of fluid from the fluid chamber 206.

In some embodiments, the fluid chamber 206 is configured to receive a magnetorheological fluid or other "smart fluid" that reacts to electrical input by changing characteristics of the fluid, such as the viscosity or shear strength of the fluid. In some embodiments, the magnetorheological fluid is MRF-122EG made by Lord Corp. of Cary, N.C., USA. In operation and as described in more detail below, the magnetorheological fluid, when energized, applies a variable drag force to the flywheel 202 according to electrical input to the magnetorheological fluid from the magnetic devices 208.

Referring still to FIG. 2, the magnetic devices 208 of the damper system 102 are located generally proximate to the flange portion 212 of the flywheel 202. In some embodiments, the magnetic devices 208 are coupled to outer surfaces 254 and 256 of the first and second extensions 234 and 236, respectively. However, in some embodiments, the magnetic devices 208 are coupled only to one of the outer surfaces 254 or 256 of the first and second extensions 234 and 236. Thus, in some embodiments, the damper system 102 includes a plurality of the magnetic devices 208 proximate to the first side 218 of the flange portion 212 and a plurality of the magnetic devices 208 proximate to the second side 220 of the flanged portion 212. For example, as illustrated in the embodiment of FIG. 4, in some embodiments the damper system 102 includes a plurality of magnetic devices 208 arranged in a radially extending pattern from a central axis 258 of the flywheel 202.

Figure 5:
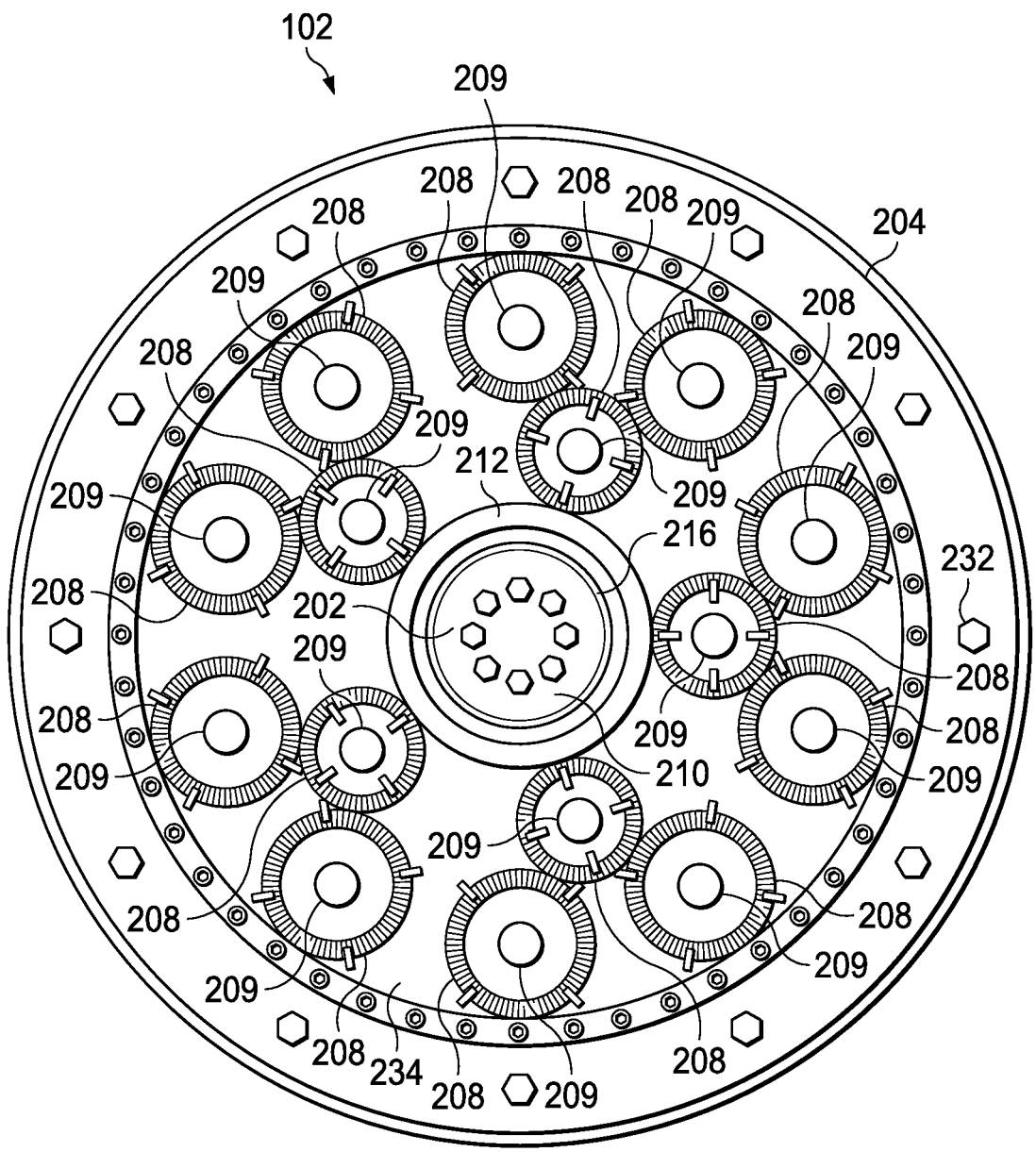
FIG. 5 is a section view taken along viewing line 4-4 of FIG. 1 with the pump housing removed showing another embodiment of a pump drivetrain damper system with a plurality of magnetic devices in accordance with this disclosure.
Figure 6:
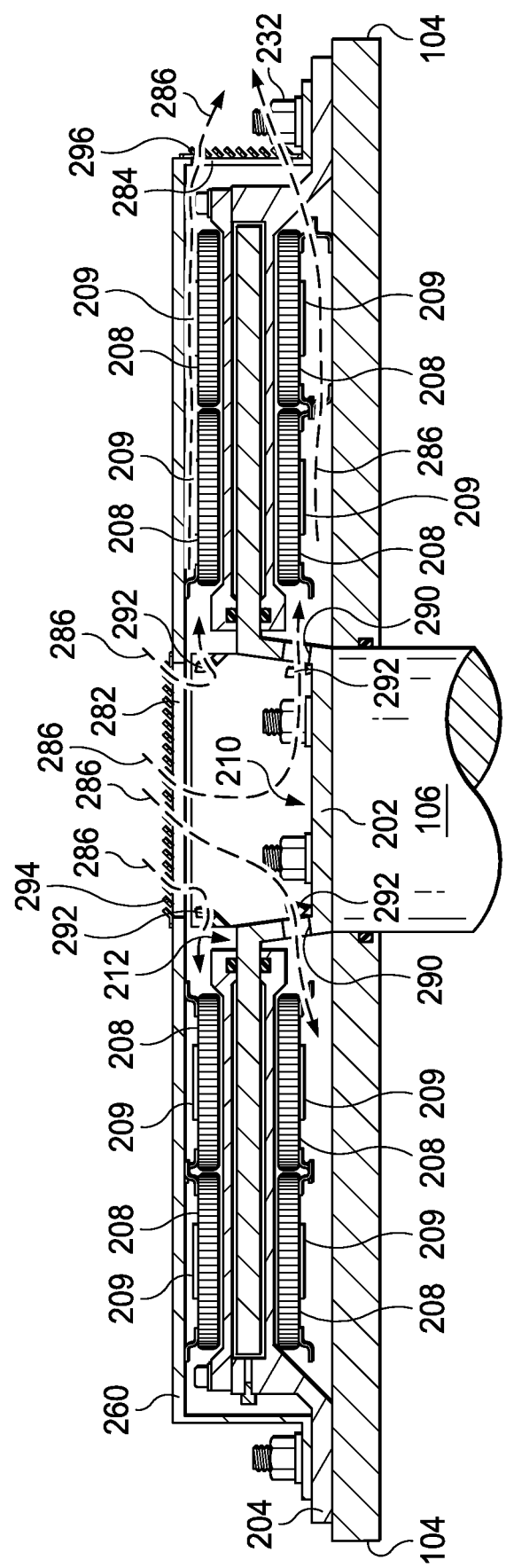
FIG. 6 is a cross-sectional side view of an embodiment of a damper system coupled to a crankshaft of a fluid pump in accordance with this disclosure.

As illustrated in FIGS. 5 and 6, in some embodiments the damper system 102 includes a plurality of magnetic devices 208 and a plurality of permanent magnets 209. In some embodiments, the permanent magnets 209 are coupled to the magnetic devices 208. In some embodiments, the permanent magnets 209 interact with the magnetorheological fluid in the fluid chamber 206 to apply a steady force to the flywheel 202 that is supplemented by forces applied by the interaction between the magnetorheological fluid and the magnetic devices 208, which, in some embodiments, are electromagnets. Thus, for example, the permanent magnets 209 apply a steady force to the flywheel 202 when torque on the flywheel 202 decreases during a cyclical downturn in torque and a variable current is applied to the electrically-controlled magnetic devices 208 to reverse the direction of flux and reduce the effect of the permanent magnets 209, thus reducing the resistance to rotating by reducing the drag when the torque cycle increases above a mean torque.

Referring back to FIG. 2, in some embodiments the magnetic devices 208 are electromagnets and each of the electromagnets is electrically coupled, either directly or indirectly, to one or more sensors 103, one or more controllers and/or one or more other electrical devices, to control activation of the electromagnets, as described in more detail below. In some embodiments the magnetic devices 208 include feet 280 that are coupled to a heat sink device to release heat from the magnetic devices 208. For example, in the embodiment illustrated in FIG. 2, the magnetic devices 208 that are connected to the first extension 234 include feet 280 that are coupled to an outer cover 260 of the damping system 102 so that heat from the magnetic devices 208 is dissipated to the outer cover 260. In some embodiments, the outer cover 260 includes cooling fins (not shown) or other heat dissipation devices.

Figures 7, 8:
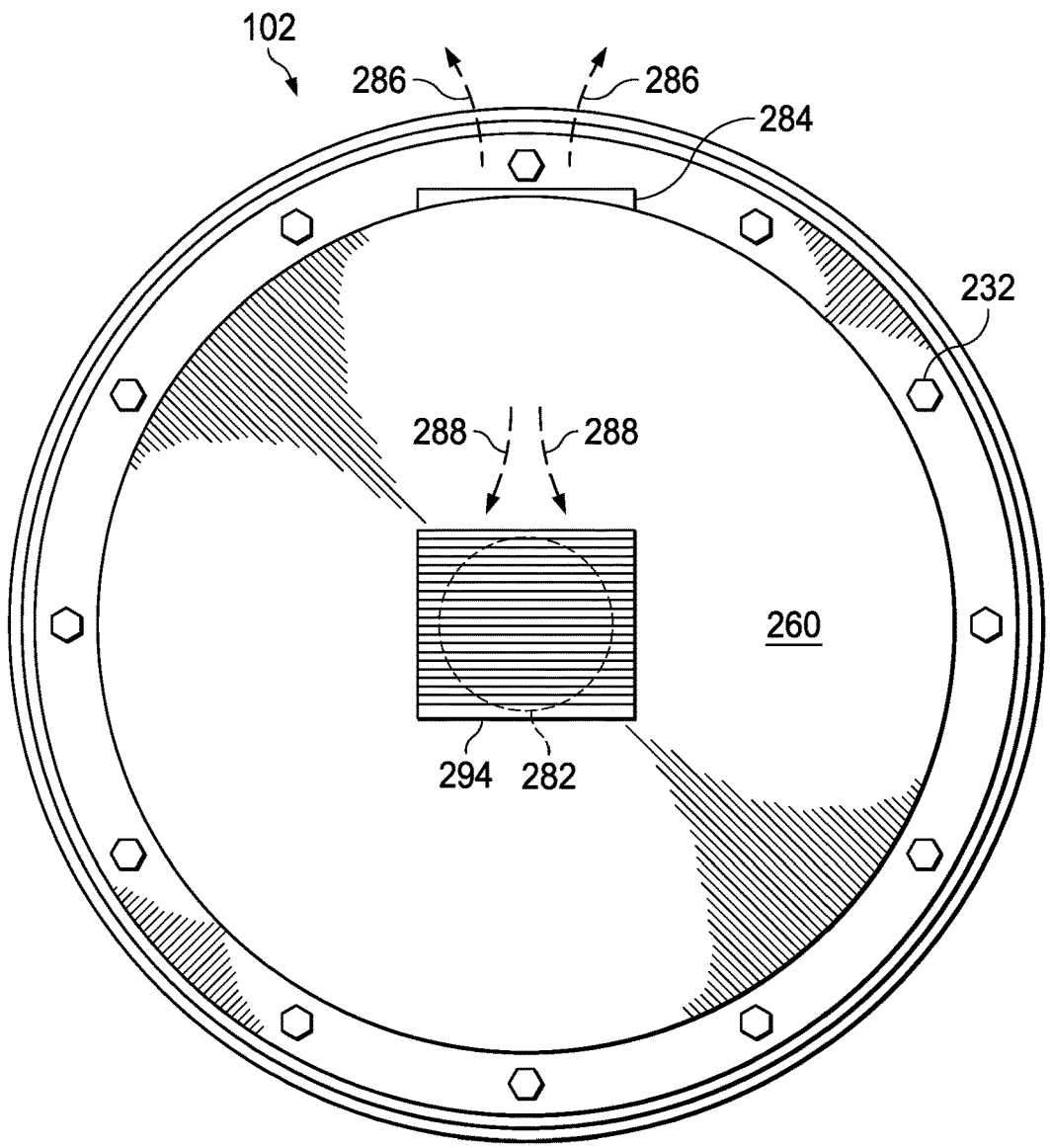
FIG. 7 is an axial view of an embodiment of a damper system in accordance with this disclosure.
FIG. 8 is a schematic block diagram illustrating an embodiment of a method for damping vibrations in a fluid pump drivetrain in accordance with this disclosure.

Referring now to FIGS. 6 and 7, in some embodiments the damper system 102 includes turbine blades 292 coupled to the flywheel 202 to induce air flow in the damper system 102 to cool the damper system 102. For example, in the embodiment illustrated in FIGS. 6 and 7, the turbine blades 292 generate an air flow from a first opening 282 in the outer cover 260 to a second opening 284 in the outer cover 260 along flow lines 286. In some embodiments, the flywheel 202 includes openings 290 to allow air to flow through the openings 290 in the flywheel 202. In other embodiments, the opening 282, 284, and 290 are located at other locations to induce airflow within the damper system 102 along alternate flow paths. In some embodiments, for example, the turbine blades 292 and the openings 282, 284, and 290 are positioned to allow for air flow in multiple directions, such as the directions shown by flow lines 286 and 288 in FIG. 7. Referring again to FIGS. 6 and 7, in some embodiments the openings 282 and 284 include air permeable covers 294 and 296, respectively. In other embodiments, heat is dissipated by use of a water jacket (not shown) with the heated water being cooled by a fan forcing air through a heat exchanger. In other embodiments, heat is dissipated by using an oil cooled system (not shown) using fan forced air through a heat exchanger.

In use, in several exemplary embodiments, the damper system 102 reduces vibrations in the pump drivetrain 105 by applying counter torsional impulses or drag forces to the crankshaft 106 based on input received from the sensors 103 located throughout the pump drivetrain 105 and other related locations, such as one or more other pump assemblies, the wellbore, and the fluid pipes. Initially, the damper system 102 is coupled to the fluid pump drivetrain 105 at a suitable location. In the embodiment illustrated in FIG. 2, for example, the damper housing 204 is coupled to the pump housing 104, and the fly wheel 202 of the damper system 102 is coupled directly to a "blind side" or end 214 of the crankshaft 106. In some embodiments, the damper system 102 is manufactured as an integral part of the reciprocating pump assembly 100 or pump drivetrain 105.

A magnetorheological fluid or other "smart fluid" is received in the fluid chamber 206 of the damper system 102 and the magnetic devices 208, such as one or more electromagnets, are coupled, either directly or indirectly, to one or more of the sensors 103 located at various locations on the pump assembly 100, the pump drivetrain 105, or other locations, as discussed above. The sensors 103 collect data concerning characteristics of the pump assembly 100, the drivetrain 105, and other equipment, such as, but not limited to, data concerning the crankshaft 106 RPM, pumping pressure, driveshaft torque, rotating crankshaft 106 position, temperature of various components, suction pressure of the fracking fluid, temperature of the magnetorheological fluid, data from other fluid pumps, vibration data from various components and other types of data. In some embodiments, the sensor data is processed and then used to control activation of the magnetic devices 208 such that the magnetic devices 208 are selectively actuated to reduce and/or otherwise eliminate unwanted vibration in the pump drivetrain 105 by imparting counter torsional impulses of a specified force to the crankshaft 106. In some embodiments, the sensor data is used to dampen current vibrations rather than compiling sensor data for predictive dampening of future vibrations. Thus, the damper system 102 reacts to current vibrations in the pump assembly 100, the pump drivetrain 105, and other related components. In other embodiments, the sensor data is used to dampen current vibrations and is also compiled to predict future vibrations. For example, in some embodiments, real-time sensor signals at a particular rotational position of the crankshaft 106 are used in conjunction with previous sensor signals at that same rotational position of the crankshaft 106 to implement a drag force that more accurately dampens vibrations in the pump drivetrain 105.

When actuated, the magnetic devices 208 create a magnetic field or flux, which activates the magnetorheological fluid to increase the viscosity and shear strength of the fluid. The activated fluid in the fluid chamber 206 applies a specified drag force to the first side 218, the second side 220 and the outside edge 222 of the flanged portion 212. In some embodiments, the drag force applied to the flywheel 202 by the magnetorheological fluid is variable by varying the viscosity and shear strength of the magnetorheological fluid. In some embodiments, the magnetorheological fluid receives and adapts to up to about 1,000 to about 1,200 electrical inputs per second based on real-time or near real-time sensor data and other inputs to the magnetic devices 208. The timing and strength of the drag forces applied to the flywheel 202 are determined by the sensor data to counteract vibrations from various sources throughout the pump drivetrain 105. The crankshaft 106 is coupled to the pump drivetrain 105 such that impulses to the crankshaft 106 also dampen vibration in the pump drivetrain 105. In other embodiments, the electromagnets are activated by DC current that can be reversed where all electromagnets, or selected electromagnets, can increase or decrease the flux or reverse the flux direction in order to dissipate residual torsional vibrations in the drivetrain.

FIG. 8 illustrates an embodiment of a method 800 for damping vibrations in the fluid pump drivetrain 105. The method 800 begins and a sensor signal is received from the sensor 103 that is operable to sense characteristics of the fluid pump drivetrain 105, as shown at block 802. An electrical signal is sent to an electromagnet of the damper system 102 in response to receiving the sensor signal, as shown at block 804. The electromagnet is selectively engaged in response to receiving the electrical signal to excite a magnetorheological fluid to apply a drag force to the flywheel 202 of the damper system 102, as shown at block 806. As described above, the excited magnetorheological fluid applies a drag force to the flywheel 202 to provide a countertorsional impulse to the pump drivetrain 105 to reduce vibrations in the pump drivetrain 105.

Figure 9:
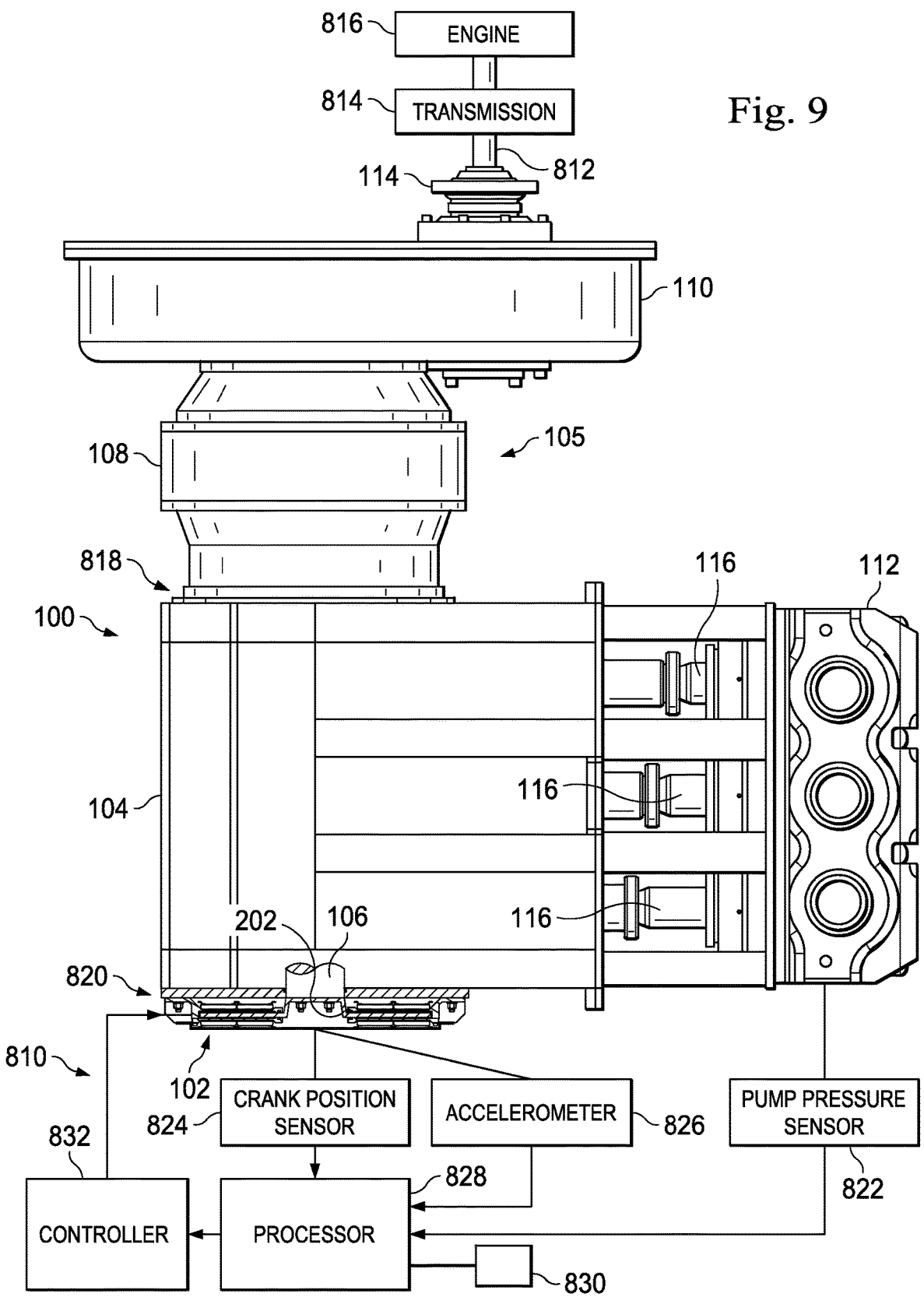
FIG. 9 is a diagrammatic view of a damper control system and a pump assembly operably coupled to the damper control system, according to an exemplary embodiment.

In an exemplary embodiment, as illustrated in FIG. 9 with continuing reference to FIGS. 1-8, a damper control system is generally referred to by the reference numeral 810 and is operably coupled to the pump assembly 100 and the damper system 102. In several exemplary embodiments, the damper control system 810 is part of the damper system 102. In several exemplary embodiments, the damper system 102 is part of the damper control system 810. As shown in FIG. 9, a driveshaft 812 is coupled to the input flange 114. The driveshaft 812 is operably coupled to, and extends between, the input flange 114 and a transmission 814. An engine 816, such as a diesel engine, is operably coupled to the transmission 814. In several exemplary embodiments, the pump drivetrain 105 includes one or more of the pump crankshaft 106, the gearbox or gear reducers 108 and 110, the input flange 114, the driveshaft 812, the transmission 814, and one or more components of the diesel engine 816. The pump assembly 100, and thus the crankshaft 106, includes opposing end portions 818 and 820. The gear reducers 108 and 110, and thus the driveshaft 812, the transmission 814, and the engine 816, are operably coupled to the crankshaft 106 at the end portion 818 thereof. The damper system 102 is operably coupled to the crankshaft 106 at the end portion 820 thereof. Thus, the flywheel 202 is operably coupled to the crankshaft 106 at the end portion 820 thereof. In several exemplary embodiments, the damper system 102 is located within the pump assembly 100 at the end portion 820 thereof. Since the end portion 820 opposes the gear reducers 108 and 110, the end portion 820 may be characterized as the "blind side" of the pump assembly 100 or the crankshaft 106.

As shown in FIG. 9, the damper control system 810 includes a pressure sensor 822 operably coupled to the fluid end housing or the fluid end 112, a crank position sensor 824 operably coupled to the crankshaft 106, and an accelerometer 826 operably coupled to the flywheel 202. In an exemplary embodiment the pressure sensor 822 is adapted to sense at least the discharge pressure of the fluid end 112. In several exemplary embodiments, instead of, or in addition to the discharge pressure, the pressure sensor 822 is adapted to sense one or more other pressures within or proximate the fluid end 112. In an exemplary embodiment, the crank position sensor 824 is coupled to, and/or disposed within, the pump assembly 100 at the end portion 820 thereof, and is adapted to sense the crank position of the crankshaft 106. In an exemplary embodiment, the accelerometer 826 is a WIFI accelerometer. In an exemplary embodiment, the accelerometer 826 is mounted on the flywheel 202. In several exemplary embodiments, the sensor 103 (shown in FIG. 1) includes one or more of the pressure sensor 822, the crank position sensor 824, and the accelerometer 826.

The damper control system 810 further includes a processor 828, which is in communication with each of the pressure sensor 822, the crank position sensor 824, and the accelerometer 826. A computer readable medium 830 is operably coupled to the processor 828. A controller 832 is in communication with the processor 828. The controller 832 is in communication with the damper system 102. In several exemplary embodiments, the controller 832 is in electrical communication with one or more of the magnetic devices 208, which in several exemplary embodiments are all electromagnets such as, for example, DC electromagnets. Exemplary embodiments of the magnetic devices 208 are shown more clearly in, for example, FIGS. 2 and 4-6.

In several exemplary embodiments, the computer readable medium 830 is a non-transitory computer readable medium and includes a plurality of instructions stored thereon; the instructions are accessible to, and executable by, the processor 828 and/or the controller 832. In several exemplary embodiments, the processor 828, the computer readable medium 830, and the controller 832 are combined in whole or in part. In several exemplary embodiments, the controller 832 includes the processor 828 in whole or in part, and/or the computer readable medium 830 in whole or in part.

Figure 10:
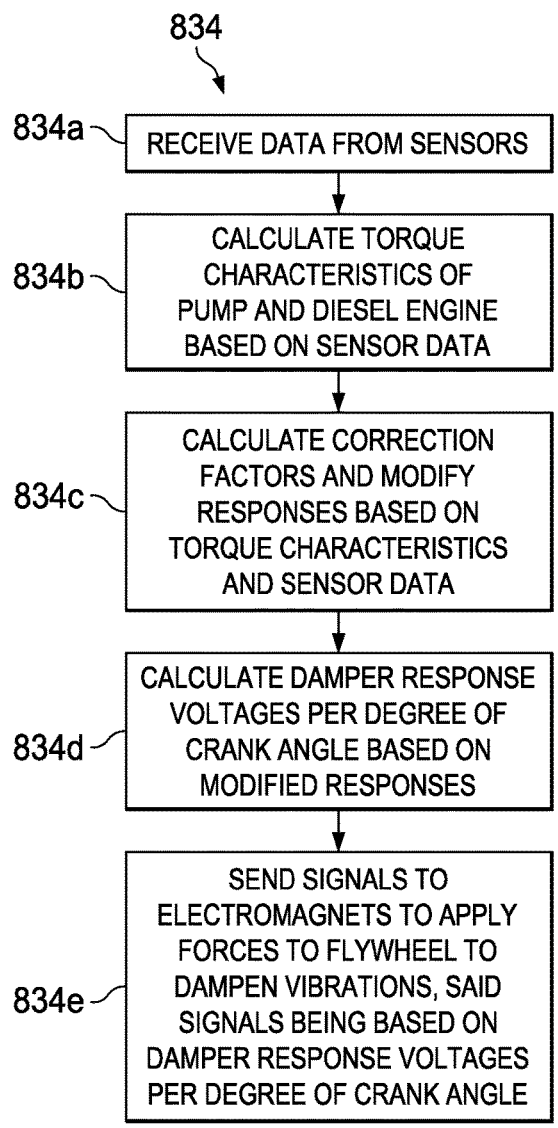
FIG. 10 is a flow chart illustration of a method of operating the damper control system of FIG. 9, according to an exemplary embodiment.

In an exemplary embodiment, as illustrated in FIG. 10 with continuing reference to FIGS. 1-9, a method of operating the damper control system 810 is generally referred to by the reference numeral 834. The method 834 includes at step 834a receiving signals or data from the sensors 822, 824, and 826 (the accelerometer 826 is a sensor and may be referred to as the sensor 826). At the step 834a, signals or data may also be received from sensors located throughout the pump assembly 100, on one or more other pump assemblies at the site at which the pump assembly 100 is located, and/or other location(s) at the site. Before, during, or after the step 834a, at step 834b torque characteristics of the pump assembly 100 and the engine 816 are calculated. Before, during, or after the step 834b, at step 834c corrections are calculated and responses are modified based on the torque characteristics calculated at step the 834b and the sensor data received at the step 834a. Before, during, or after the step 834c, at step 834d damper response voltages per degree of crank angle are calculated based on the responses as modified at the step 834c. Before, during, or after the step 834d, at step 834e control signals, such as voltage signals, are sent to one or more of the magnetic devices 208 to apply force(s) to the flywheel 202 to dampen vibrations in at least one or more of the crankshaft 106, the gear reducers 108 and 110, the input flange 114, the driveshaft 812, the transmission 814, and the engine 816. In several exemplary embodiments, in addition to at least one or more of the crankshaft 106, the gear reducers 108 and 110, the input flange 114, the driveshaft 812, the transmission 814, and the engine 816, at the step 834e the control signals are sent to one or more of the magnetic devices 208 to dampen vibrations within the pump assembly 100 including, in several exemplary embodiments, one or more of the plungers 116 and/or the fluid end 112.

Figure 11:
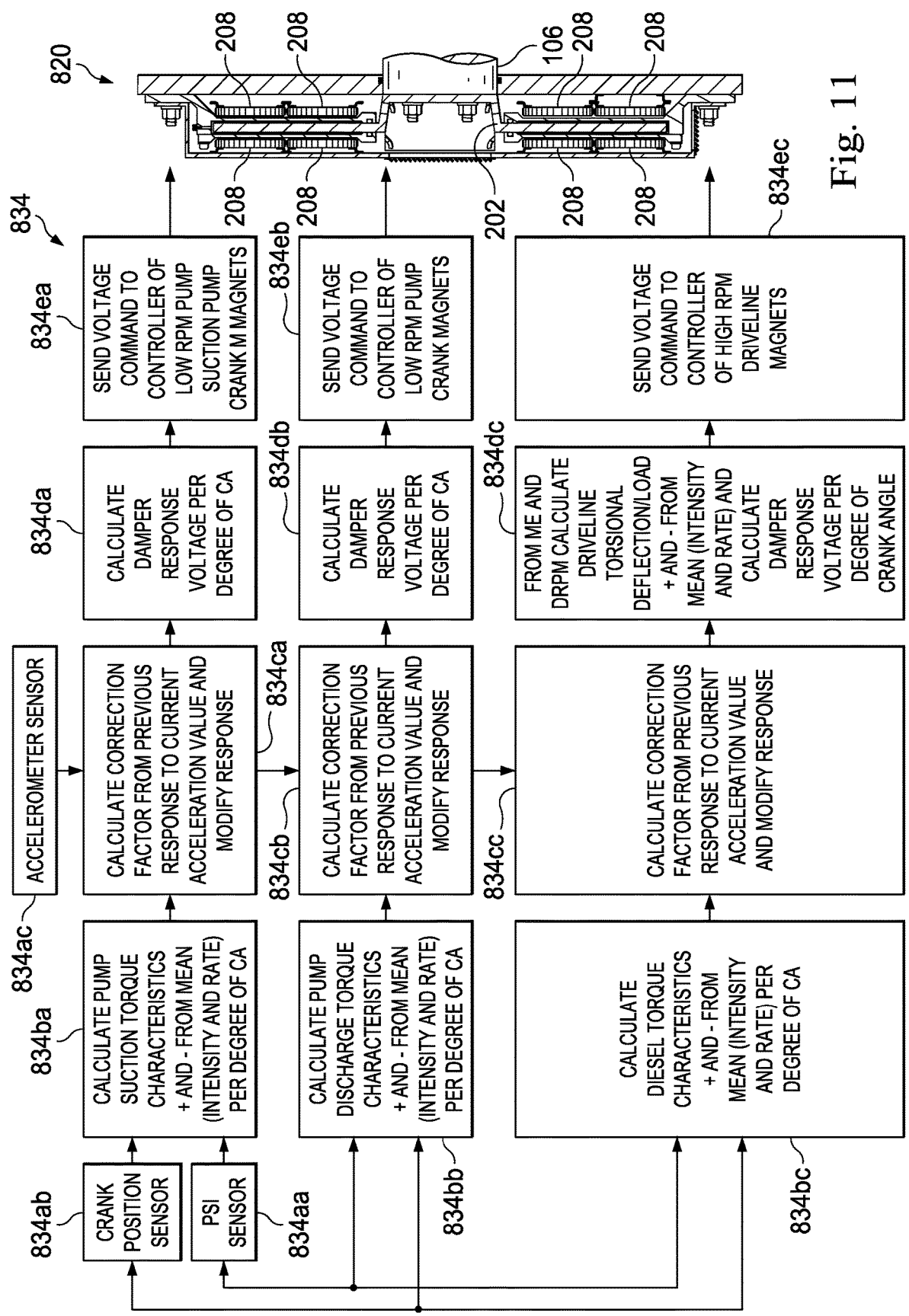
FIG. 11 is a block diagram of sub-steps of the steps of the method of FIG. 10, according to an exemplary embodiment.

In an exemplary embodiment, as illustrated in FIG. 11 with continuing reference to FIGS. 1-10, the step 834a includes receiving signals or data from the pressure sensor 822 at step 834aa, receiving signals or data from the crank position sensor 824 at step 834ab, and receiving signals or data from the accelerometer 826 at step 834ac. In several exemplary embodiments, at the step 834a the processor 828 receives signals or data from the pressure sensor 822 at the step 834aa, receives signals or data from the crank position sensor 824 at the step 834ab, and receives signals or data from the accelerometer 826 at the step 834ac. In several exemplary embodiments, one or more of the steps 834aa, 834ab, and 834ac are executed using one or more of the processor 828, the computer readable medium 830, and the controller 832. In several exemplary embodiments, the steps 834aa, 834ab, and 834ac are executed serially, simultaneously, or partially serially and partially simultaneously. In several exemplary embodiments, each of the steps 834aa, 834ab, and 834ac is executed before, during, or after the other of the steps 834aa, 834ab, and 834ac. In several exemplary embodiments, one or more of the steps 834aa, 834ab, and 834ac are omitted from the step 834a.

The step 834b includes calculating pump suction torque characteristics of the pump assembly 100, including torque variance relative to, e.g., variance above and below (+&−), the mean (both intensity and rate) per degree of crank angle at step 834ba; in several exemplary embodiments, the step 834ba is executed using at least the sensor data received at the steps 834*aa* and 834*ab*. The step 834*b* further includes calculating pump discharge torque characteristics of the pump assembly 100, including torque variance relative to, e.g., variance above and below (+&−), the mean (both intensity and rate) per degree of crank angle at step 834*bb*; in several exemplary embodiments, the step 834*bb* is executed using at least the sensor data received at the steps 834*aa* and 834*ab*. The step 834*b* further includes calculating torque characteristics of the engine 816, including torque variance relative to, e.g., variance above and below (+&−), the mean (both intensity and rate) per degree of crank angle at step 834*bc*; in several exemplary embodiments, the step 834*bc* is executed using at least the sensor data received at the steps 834*aa* and 834*ab*.

In several exemplary embodiments, one or more of the steps 834*ba*, 834*bb*, and 834*bc* are executed using one or more of the processor 828, the computer readable medium 830, and the controller 832. In several exemplary embodiments, the steps 834*ba*, 834*bb*, and 834*bc* are executed serially, simultaneously, or partially serially and partially simultaneously. In several exemplary embodiments, each of the steps 834*ba*, 834*bb*, and 834*bc* is executed before, during, or after the other of the steps 834*ba*, 834*bb*, and 834*bc*. In several exemplary embodiments, one or more of the steps 834*ba*, 834*bb*, and 834*bc* are omitted from the step 834*b*.

The step 834*c* includes calculating a first correction factor from a previous response to the current acceleration value, as sensed by the accelerometer 826, and modifying the response at step 834*ca*; in several exemplary embodiments, the step 834*ca* is executed using at least the sensor data received at the step 834*ac* and the pump suction torque characteristics calculated at the step 834*ba*. The step 834*c* further includes calculating a second correction factor from a previous response to the current acceleration value, as sensed by the accelerometer 826, and modifying the response at step 834*cb*; in several exemplary embodiments, the step 834*cb* is executed using at least the pump discharge torque characteristics calculated at the step 834*bb* and the modified response determined at the step 834*ca*. The step 834*c* further includes calculating a third correction factor from a previous response to the current acceleration value, as sensed by the accelerometer 826, and modifying the response at step 834*cc*; in several exemplary embodiments, the step 834*cc* is executed using at least the engine torque characteristics calculated at the step 834*bc* and the modified response determined at the step 834*cb*.

In several exemplary embodiments, one or more of the steps 834*ca*, 834*cb*, and 834*cc* are executed using one or more of the processor 828, the computer readable medium 830, and the controller 832. In several exemplary embodiments, the steps 834*ca*, 834*cb*, and 834*cc* are executed serially, simultaneously, or partially serially and partially simultaneously. In several exemplary embodiments, each of the steps 834*ca*, 834*cb*, and 834*cc* is executed before, during, or after the other of the steps 834*ca*, 834*cb*, and 834*cc*. In several exemplary embodiments, one or more of the steps 834*ca*, 834*cb*, and 834*cc* are omitted from the step 834*c*.

The step 834*d* includes at step 834*da* calculating a damper response voltage per degree of crank angle using at least the modified response determined at the step 834*ca* (which is based on at least the pump suction torque characteristics calculated at the step 834*ba*), at step 834*db* calculating a damper response voltage per degree of crank angle using at least the modified response determined at the step 834*cb* (which is based on at least the pump discharge torque characteristics calculated at the step 834*bb*), and at step 834*dc* calculating driveline torsional deflection/load variation relative to, e.g., above and below (+&−), the mean (both intensity and rate) and calculating a damper response voltage per degree of crank angle using at least the modified response determined at the step 834*cc* (which is based on at least the engine torque characteristics calculated at the step 834*bc*).

In several exemplary embodiments, one or more of the steps 834*da*, 834*db*, and 834*dc* are executed using one or more of the processor 828, the computer readable medium 830, and the controller 832. In several exemplary embodiments, the steps 834*da*, 834*db*, and 834*dc* are executed serially, simultaneously, or partially serially and partially simultaneously. In several exemplary embodiments, each of the steps 834*da*, 834*db*, and 834*dc* is executed before, during, or after the other of the steps 834*da*, 834*db*, and 834*dc*. In several exemplary embodiments, one or more of the steps 834*da*, 834*db*, and 834*dc* are omitted from the step 834*d*.

The step 834*e* includes at step 834*ea* sending a voltage command to the controller 832 for one or more of the magnetic devices 208 corresponding to the control of the low RPM in the suction portion of the pump stroke, the voltage command being based on the damper response voltage per degree of crank angle calculated at the step 834*da*. At step 834*eb* a voltage command is sent to the controller 832 for one or more of the magnetic devices 208 corresponding to the control of the low RPM in the pump assembly 100, the voltage command being based on the damper response voltage per degree of crank angle calculated at the step 834*db*. At step 834*ec* a voltage command is sent to the controller 832 for one or more of the magnetic devices 208 corresponding to the control of the high RPM driveline including one or more of the driveshaft 812, the transmission 814, and one or more components of the engine 816, the voltage command being based on the damper response voltage per degree of crank angle calculated at the step 834*dc*. In response to receiving the voltage commands at the steps 834*ea*, 834*eb*, and 834*ec*, during the step 834*e* the controller 832 sends control signals, such as voltage signals, to one or more of the magnetic devices 208 based on the voltage commands received at the steps 834*ea*, 834*eb*, and 834*ec*, which, in turn, are based on the damper response voltages per degree of crank angle calculated at the steps 834*da*, 834*db*, and 834*dc*, respectively. Thus, the control signals sent to the one or more magnetic devices 208 at the step 834*e* are based on one or more of the damper response voltages per degree of crank angle calculated at the steps 834*da*, 834*db*, and 834*dc*.

In several exemplary embodiments, one or more of the steps 834*ea*, 834*eb*, and 834*ec* are executed using one or more of the processor 828, the computer readable medium 830, and the controller 832. In several exemplary embodiments, the steps 834*ea*, 834*eb*, and 834*ec* are executed serially, simultaneously, or partially serially and partially simultaneously. In several exemplary embodiments, each of the steps 834*ea*, 834*eb*, and 834*ec* is executed before, during, or after the other of the steps 834*ea*, 834*eb*, and 834*ec*. In several exemplary embodiments, one or more of the steps 834*ea*, 834*eb*, and 834*ec* are omitted from the step 834*e*.

In several exemplary embodiments, in accordance with the method 834 as illustrated in FIGS. 10 and 11 and described above, up to three control signals are transmitted to one or more of the magnetic devices 208. In an exemplary embodiment, the magnetic devices 208 may be DC magnets, which allow for a reversal of the direction of flux which can cancel out the effect of the permanent magnets 209. In an exemplary embodiment, the magnetic devices 208 are grouped for three levels of dampening response. One level, corresponding to the step 834*eb*, is the response to the high torque variations of the pump assembly 100 while it is being used to hydraulically fracture a subterranean formation through which a wellbore extends. Another level, corresponding to the step 834*ea*, is to negate rod shock loads and cavitation loads in the suction portion of the pump stroke. The remaining level, corresponding to the step 834*ec*, is to respond to the engine torsional deflection coming from the engine 816 and arriving at a higher frequency; in several exemplary embodiments the engine 816 is a diesel engine.

In several exemplary embodiments, the use of the accelerometer 826 in accordance with the method 834 provides a feedback loop to detect torsional vibrations that are the results of other phenomena than what is being calculated. Examples of such torsional vibrations include vibrations due to an increased amount of air in the fracturing fluid, vibrations due to drops in pressure that cause cavitation, vibrations that are hydraulically induced from, for example, fracturing trucks at the fracturing site that are being used to pump fluid to the same wellbore that the pump assembly 100 is being used to pump fluid to, vibrations dues to changes in RPM that change the elastic mass behavior, etc. In accordance with the foregoing, during the method 834, the signal or data received from the accelerometer 826 is processed and correction factor(s) are established to correct the command signal(s) to negate the unpredicted vibrations.

In several exemplary embodiments, the controller 832 includes at least three controllers.

Figure 12:
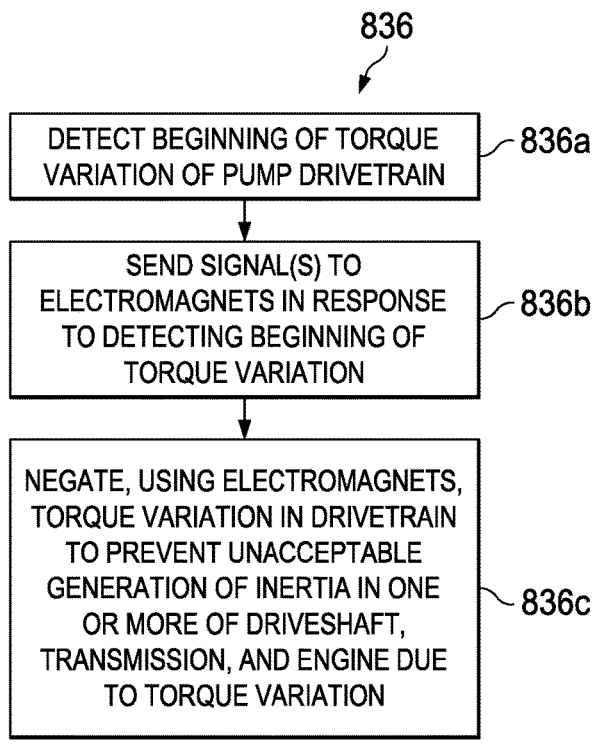
FIG. 12 is a method of operating the damper control system of FIG. 10, according to another exemplary embodiment.

In an exemplary embodiment, as illustrated in FIG. 12 with continuing reference to FIGS. 1-11, a method of operating the damper control system 810 is generally referred to by the reference numeral 836. The method 836 includes detecting the beginning of torque variation in the pump drivetrain at step 836*a*, and at step 836*b* sending signal(s) to one or more of the magnetic devices 208 in response to the detecting the beginning of torque variation at the step 836*a*. At step 836*c* the torque variation in the pump drivetrain is negated, using the magnetic devices 208 and the signals sent thereto at the step 836*b*, to prevent the unacceptable generation of inertia in at least one or more of the driveshaft 812, the transmission 814, and the engine 816 due to the torque variation. In several exemplary embodiments, the method 836 is executed by executing the method 834. In several exemplary embodiments, the step 836*a* of the method 836 includes at least the steps 834*a* and 834*b* of the method 834. In several exemplary embodiments, the step 836*a* includes at least the steps 834*a* and 834*b* of the method 834, as well as the step of determining that one or more of the respective torque variances calculated at the step 834*b* have reached unacceptable threshold levels above and/or below the mean (both intensity and rate) per degree of crank angle, the step of determining one or more unacceptable trends in the respective torque variances, the step of determining that one or more of the respective torque variances have reached unacceptable percentages, and/or any combination thereof. In several exemplary embodiments, the step 836*b* includes at least the steps 834*c*, 834*d*, and 834*e* of the method 834.

In several exemplary embodiments, as a result of the operation of the damper control system 810, the execution of the method 834, or the execution of the method 836, torque variation is eliminated before the rotating components in, for example, the driveshaft 812, the transmission 814, and one or more of the components of the engine 816, are energized by the inertia. In several exemplary embodiments, the operation of the damper control system 810, or the execution of the method 834 or 836, negates the torque variation instead of merely dampening the torque variation.

In several exemplary embodiments, as a result of the operation of the damper control system 810, the execution of the method 834, and/or the execution of the method 836, the beginning of a torque variation in the pump assembly 100 is anticipated and the torque variation is negated as it is happening. As a result, the torque variation is prevented from setting up momentum in the heavy rotating parts of, for example, the driveshaft 812, the transmission 814, and one or more components of the engine 816, which momentum otherwise creates inertia that must be dissipated after the fact, requiring more energy due to the mass moment of inertia set up by the torque variation and the heavy rotating parts. However, this energy is not required because of the operation of the damper control system 810, the execution of the method 834, and/or the execution of the method 836.

In several exemplary embodiments, in accordance with the operation of the damper control system 810, the execution of the method 834, and/or the execution of the method 836, a pump monitoring computer, which may be, include, or be part of, one or more of the processor 828, the computer readable medium 830, and the controller 832, is used to collect pump data and calculate the right response needed to negate the torque variation as it is being created by the reciprocating action of at least the plungers 116. In several exemplary embodiments, this pump monitoring computer is set for the type of pump that the pump assembly 100 is, the stroke length of the plungers 116, the diameter of the plungers 116, the unswept volume of the fluid end 112, the swept volume of the fluid end 112, volume to compress, valve spring rate, valve opening pressure, compressibility of the frac fluid in use, throw of the crank, rod length, pump RPM, crank angle, and pump pressure. In several exemplary embodiments, the pump monitoring computer runs a program to determine valve delay; in several exemplary embodiments this program may be stored on the computer readable medium 830 and executed by the processor 828 and/or the controller 832. Valve delay is the starting point of the reversal of the torque cycle. Valve delay is programmed for crank angle event (three for a triplex pump, five for a quintuplex pump) and the program results, of the geometry to the rotating parts, determines the peaks and valleys of the torque varying curves, including at what crank angle they occur. At the opening of a valve, the damper system 102 receives one or more control signals from the controller 832 to change the electrical current in the magnetic devices 208 (which may be electromagnets), inducing magnetic fields in the magnetorheological fluid in the fluid chamber 206, increasing the shear strength of the magnetorheological fluid, causing a resistance in the rotation of the crankshaft 106 that is proportional to the building torque and thus negating it. In several exemplary embodiments, at mid stroke the signals sent or transmitted to the magnetic devices 208 begin to be reduced until the release of resistance in the rotating crankshaft 106 equals the programmed rate of torque decrease. In several exemplary embodiments, the damper system 102 includes a predetermined load so that the cycle can go plus and minus, peak to peak, of the increase and decrease in torque; this is accomplished by the permanent magnets 209 whose effect is altered by the program's calculation(s) and thus alters the signals being sent or transmitted to the magnetic devices 208; in several exemplary embodiments, this altering includes altering the electrical current flowing into the magnetic devices 208, which may be electromagnets such as, for example, DC magnets.

In several exemplary embodiments, the calculations made during the operation of the damper control system 810, the execution of the method 834, and/or the execution of the method 836, use different inputs, variables, parameters, intermediate calculations, and/or outputs, including one or more of the following: S=Stroke length (in exemplary embodiments this may be determined from the specifications of the pump assembly 100); T=type of pump (i.e., the pump assembly 100 is a triplex pump, a quintuplex pump, etc.); RL=Rod Length (in exemplary embodiments this may be determined from the specifications of the pump assembly 100); RLS=Rod Load Shock (in exemplary embodiments this may be determined from calculations); RLSA=Angle at which rod load shock occurs (in exemplary embodiments this may be determined from historical recording data); D=Plunger Diameter (in exemplary embodiments this may be determined from the specifications of the pump assembly 100); RPM=Pump Crank RPM (in exemplary embodiments this may be determined from sensors coupled to the pump assembly 100); DRPM=Diesel RPM (in exemplary embodiments this may be determined from sensors coupled to the engine 816); PSI=Pump Discharge Pressure (in exemplary embodiments this may be determined from sensors such as, for example, the sensor 822); PPK=Pressure peak during valve opening (in exemplary embodiments this may be determined from sensors); PVO=Pressure at Valve Opening (in exemplary embodiments this may be determined from PPK, PSI, and calculations); PVOA=Crank angle at valve opening (in exemplary embodiments this may be determined from PVO and Crank position); CA=Pump Crank Angle (in exemplary embodiments this may be determined from sensors); CT=Pump Crank throw (in exemplary embodiments this may be determined from specifications of the pump assembly 100); C=Compressibility of frac fluid (in exemplary embodiments this may be determined from frac company data); VD=Valve Delay (in exemplary embodiments this may be determined from calculations); VA1=Calculated crank angle of first discharge valve opening (in exemplary embodiments this may be determined from calculations); VA2=Calculated crank angle of second discharge valve opening (in exemplary embodiments this may be determined from calculations); VA3=Calculated crank angle of third discharge valve opening (in exemplary embodiments this may be determined from calculations); VA4=Calculated crank angle of fourth discharge valve opening (in exemplary embodiments this may be determined from calculations and for quintuplex pump types); VA5=Calculated crank angle of fifth discharge valve opening (in exemplary embodiments this may be determined from calculations and for quintuplex pump types); TVO=Torque at valve opening (in exemplary embodiments this may be determined from calculations and crank position sensor 824); UV=Unswept volume (in exemplary embodiments this may be determined from computational fluid dynamics (CFD) of a solid model of the Fluid Cylinder (or the fluid end 112 in whole or in part)); SV=Swept volume (in exemplary embodiments this may be determined from CFD of a solid model of the Fluid Cylinder (or the fluid end 112 in whole or in part)); TV=Total volume to compress (in exemplary embodiments this may be determined from CFD of a solid model of the Fluid Cylinder (or the fluid end 112 in whole or in part)); PTV=Plunger Position When TV is achieved (in exemplary embodiments this may be determined from specifications of the pump assembly 100 and TV calculations); CO=Controller Output (control signal(s) to magnetic devices 208 (e.g., voltage signal(s) to electromagnets)); ME=Mass Elastic properties of the rotating components in the entire drivetrain (in exemplary embodiments this may be determined by dynamic FEA modeling of the rotating parts in the drivetrain); and DN=Number of cylinders in the engine 816 (in several exemplary embodiments a diesel engine). In several exemplary embodiments, during the operation of the damper control system 810, the execution of the method 834, and/or the execution of the method 836, VA1 is a function of at least RPM, PSI, and PTV, VA2 is a function of at least RPM, PSI, and PTV plus either 72 (for quintuplex pump type) or 60 (for triplex pump type), VA3 is a function of at least RPM, PSI, and PTV plus either 144 (for quintuplex pump type) or 120 (for triplex pump type), VA4 is a function of at least RPM, PSI, and PTV plus 216 (for quintuplex pump type), and VA5 is a function of at least RPM, PSI, and PTV+288 (for quintuplex pump type). In several exemplary embodiments, the calculations made during the operation of the damper control system 810, the execution of the method 834, and/or the execution of the method 836, employ a model based on Maxwell's equations for the magnetic field and Navier-Stokes equations for the fluid flow, with magnetic volume force being based on a calculated magnetic field coupled with a fluid-flow problem.

Figure 13:
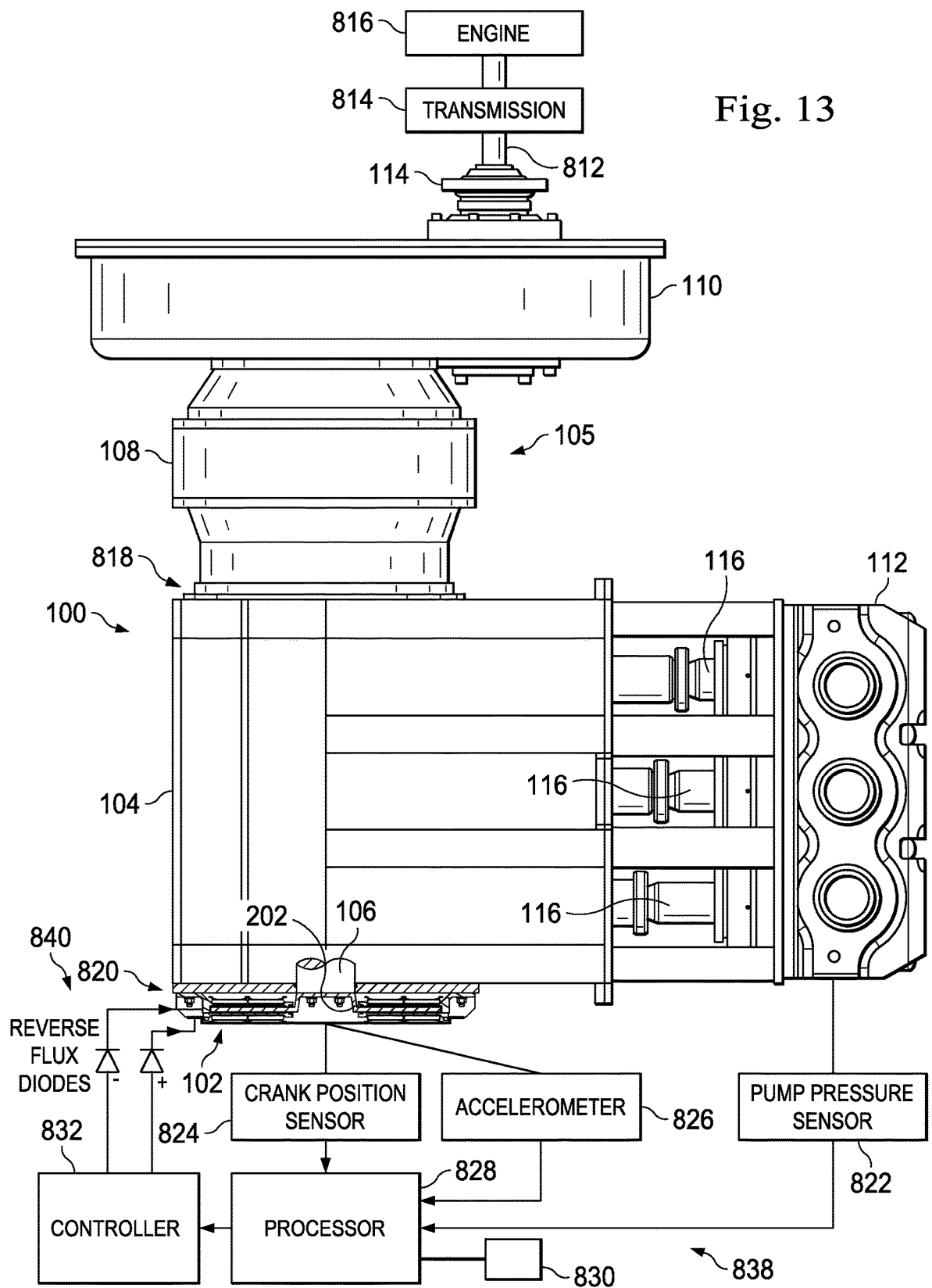
FIG. 13 is a diagrammatic view of a damper control system, according to another exemplary embodiment.

In an exemplary embodiment, as illustrated in FIG. 13 with continuing reference to FIGS. 1-12, a damper control system is generally referred to by the reference numeral 838 and includes all of the components of the damper control system 810, which common components are given the same reference numerals. The damper control system 838 illustrated in FIG. 13 further includes reverse flux diodes 840, which are electrically coupled in-line between the controller 832 and the magnetic devices 208. In several exemplary embodiments, the magnetic devices 208 are DC electromagnets activated by DC current that can be reversed wherein all electromagnets, or selected electromagnets, can increase or decrease the flux or reverse the flux direction in order to dissipate residual torsional vibrations in the drivetrain. In several exemplary embodiments, the magnetic devices 208 may be DC magnets, which allow for a reversal of the direction of flux which can cancel out the effect of the permanent magnets 209. In several exemplary embodiments, the reverse flux diodes 840 negate the reverse commands to prevent the signals sent to the magnetic devices 208 from coming back to the controller 832. In several exemplary embodiments, except for this additional operation of the reverse flux diodes 840, the operation of the damper control system 838 is identical to the above-described operation of the damper control system 810; therefore, the operation of the damper control system 838 will not be described in further detail. In several exemplary embodiments, the method 834 is a method of operating the damper control system 838 illustrated in FIG. 13. In several exemplary embodiments, the method 834 may be executed using the damper control system 838. In several exemplary embodiments, the method 836 is a method of operating the damper control system 838 illustrated in FIG. 13. In several exemplary embodiments, the method 836 may be executed using the damper control system 838.

Figure 14:
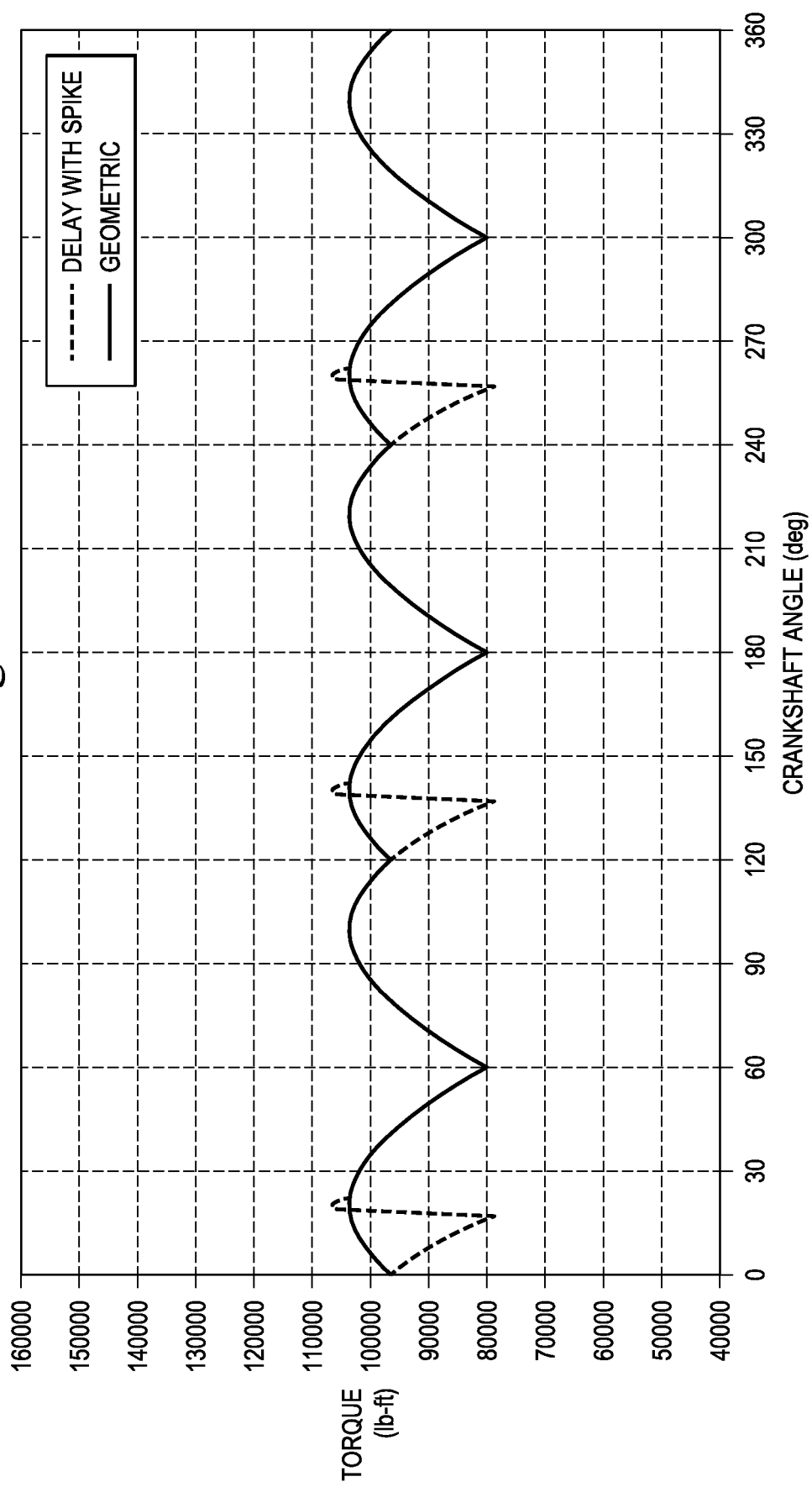
FIG. 14 is a chart illustrating theoretical torque variation per RPM of a triplex reciprocating pump assembly used in hydraulic fracturing operations, according to an exemplary embodiment.

In an exemplary embodiment, as illustrated in FIG. 14 with continuing reference to FIGS. 1-13, an exemplary embodiment of theoretical torque variation per RPM of a triplex reciprocating pump assembly used in hydraulic fracturing operations is provided in a chart. The non-jagged line in the chart is the accumulated theoretical torque and the jagged lines show correction for valve delay. Valve delay is the result of the need for the fluid being pumped by the pump assembly 100 to compress and build up pressure to the hydraulic fracturing pressure before the discharge valve within the fluid end 112 will open. The resulting shock of the sudden opening of the discharge valve puts a torque spike into the rotating components from the engine 816 to the pump assembly 100. As shown in FIG. 14, the mean torque of the triplex reciprocating pump assembly may be about 95000 ft-lbs. In several exemplary embodiments, variations above and below this mean occur once per revolution and, in common hydraulic fracturing operations, this means that 630 to 1500 times per minute the torque varies a minimum of 23% on the triplex reciprocating pump assembly. Other factors in the drivetrain will add to this percentage such as, for example, cavitation, valve delay, rod shock, engine vibrations, etc. Since the driveline from the pump assembly 100 to the engine 816 is hard coupled, the torque variation travels along the entire drivetrain with the torque variations of the engine 816 (such as a reciprocating diesel engine) added to it. However, each of the operation of the damper control system 810, the operation of the damper control system 838, the execution of the method 834, and the execution of the method 836, negates these torque variations as they occur, rather than after the inertia gets into the rotating mass, thereby reducing the damaging torque or vibration to such a level that the left-over (or remaining) torque or vibration will no longer damage the equipment in the drivetrain.

Figure 15:
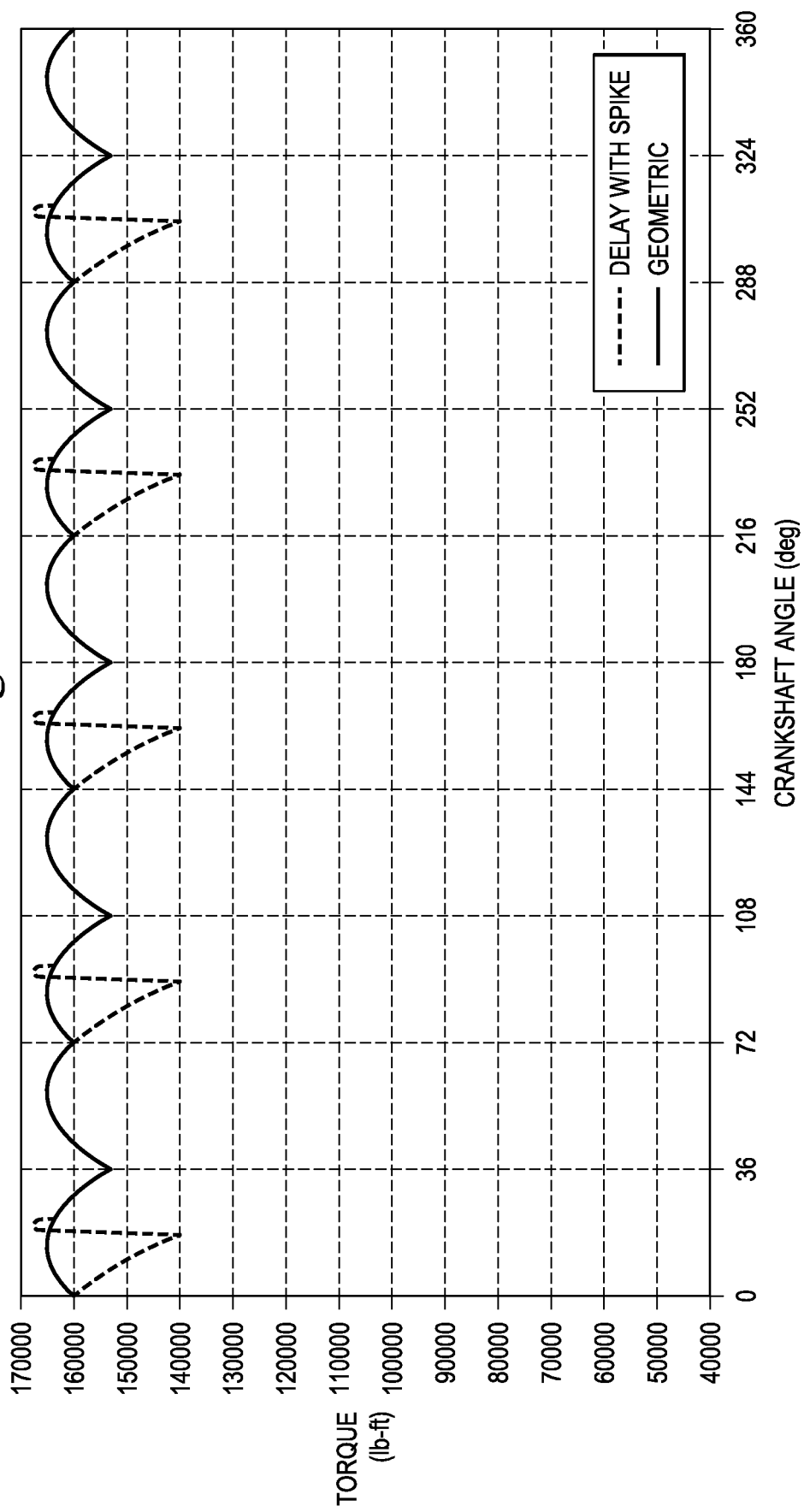
FIG. 15 is a chart illustrating theoretical torque variation per RPM of a quintuplex reciprocating pump assembly used in hydraulic fracturing operations, according to an exemplary embodiment.

In an exemplary embodiment, as illustrated in FIG. 15 with continuing reference to FIGS. 1-14, an exemplary embodiment of theoretical torque variation per RPM of a quintuplex reciprocating pump assembly used in hydraulic fracturing operations is provided in a chart. The non-jagged line in the chart is the accumulated theoretical torque and the jagged lines show correction for valve decay. As discussed above, valve decay is the result of the need for the fluid being pumped by the pump assembly 100 to compress and build up pressure to the hydraulic fracturing pressure before the discharge valve within the fluid end 112 will open. The resulting shock of the sudden opening of the discharge valve puts a torque spike into the rotating components from the engine 816 to the pump assembly 100. As shown in FIG. 15, the mean torque of the quintuplex reciprocating pump assembly may be about 160000 ft-lbs. In several exemplary embodiments, variations above and below this mean occur once per revolution and, in common hydraulic fracturing operations, this means that 1050 to 2500 times per minute the torque varies a minimum of 7% on the quintuplex reciprocating pump assembly. Other factors in the drivetrain will add to this percentage such as, for example, cavitation, valve delay, rod shock, engine vibrations, etc. Since the driveline from the pump assembly 100 to the engine 816 is hard coupled, the torque variation travels along the entire drivetrain with the torque variations of the engine 816 (such as a reciprocating diesel engine) added to it. However, each of the operation of the damper control system 810, the operation of the damper control system 838, the execution of the method 834, and the execution of the method 836, negates these torque variations as they occur, rather than after the inertia gets into the rotating mass, thereby reducing the damaging torque or vibration to such a level that the left-over (or remaining) torque or vibration will no longer damage the equipment in the drivetrain.

In several exemplary embodiments, in accordance with one or more of the damper control system 810, the method 834, the method 836, and the damper control system 838, a smart magnetorheological driveline damper mounted on the blind side of the crank of a hydraulic fracturing pump assembly can dampen torque variations or vibrations as they occur thereby preventing the mass moment of inertia from passing beyond the crank and into the gear box, the driveshaft, the transmission, and the diesel engine where it causes expensive wear damage to all rotating components (the transmission usually fails first, in about 1200 hours). Accordingly, one or more of the damper control system 810, the method 834, the method 836, and the damper control system 838 lengthen the useful operational lives of one or more of the crankshaft 106, the gear reducers 108 and 110, the driveshaft 812, the transmission 814, and the engine 816.

Figure 16:
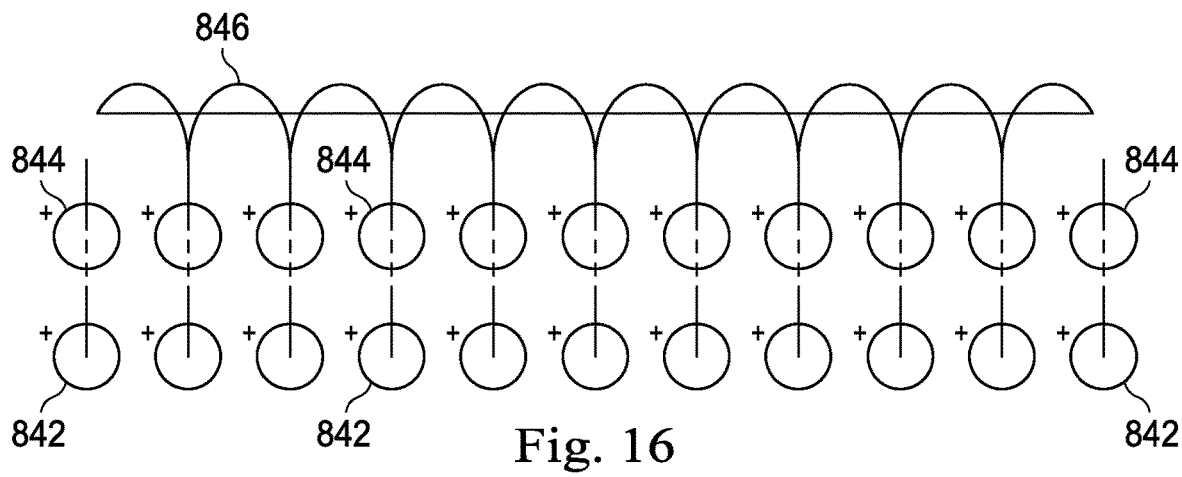
FIGS. 16 and 17 are diagrammatic illustrations of permanent magnets in combination with a representation of hydraulic pressure fluctuations within a pump assembly, according to respective exemplary embodiments.

In an exemplary embodiment, as illustrated in FIG. 16 with continuing reference to FIGS. 1-15, the damper system 102 includes a plurality of fixed permanent magnets 842 having respective positive poles. In several exemplary embodiments, one or more of the fixed permanent magnets 842 are connected to the damper housing 204, the power end housing 104, or a combination thereof. The damper system 102 further includes a plurality of rotating permanent magnets 844 having respective positive poles. In several exemplary embodiments, one or more of the rotating permanent magnets 844 are connected to the flywheel 202, the crankshaft 106, or a combination thereof. In several exemplary embodiments, each of the respective positive poles of the fixed permanent magnets 842 is adapted to interact with a corresponding one of the respective positive poles of the rotating permanent magnets 844.

In several exemplary embodiments, the pump assembly 100 is a quintuplex pump, and the hydraulic pressure therein undergoes fluctuation during the operation of the quintuplex pump. A representation 846 of this hydraulic pressure fluctuation during the operation of the quintuplex pump is shown in FIG. 16. During the above-described operation of the damper system 102, the rotating permanent magnets 844 rotate along with the flywheel 202. During this rotation, the respective positive poles of the fixed permanent magnets 842 interact with corresponding ones of the respective positive poles of the rotating permanent magnets 844, urging a separation between each pair of poles when the hydraulic pressure is dropping or decreasing, as shown in FIG. 16. In several exemplary embodiments, the magnetic devices 208 are electromagnets, and the damper system 102 uses the magnetic devices 208 to affect the behavior of the interaction between the respective sets of positive poles of the fixed permanent magnets 842 and the rotating permanent magnets 844. As a result, in several exemplary embodiments, load is reduced and/or heat is reduced. In several exemplary embodiments, the fixed permanent magnets 842 and the rotating permanent magnets 844 are strategically placed to reduce the load.

In several exemplary embodiments, the magnetic devices 208 are used by the damper system 102 so that the magnetorheological-induced drag (to dampen changes in the mass moment of inertia) is computed and applied at the precise time that the load is created within the rotating mass (coming from the reciprocating load) so as to dampen it before it becomes a change in inertia in the rotating components. All energy to accomplish this turns to heat and this heat accumulates in the magnetorheological fluid. Therefore, this heat is dissipated using one or more cooling methods. In several exemplary embodiments, some of the predicted energy changes are held by the permanent magnets 842 and/or 844; as a result, some or all of the heat energy is cooled by, for example, flowing air, and the electrical current needed to activate the magnetorheological fluid is reduced. As shown in FIG. 16, the permanent magnets 842 and 844 are positioned according to the timing of the reciprocating energy. In FIG. 16, the pump assembly 100 being a quintuplex pump is only one example of a pump; the pump assembly 100 may be another type of pump and thus the respective quantities of the permanent magnets 842 and 844 may be increased or reduced. For example, if the pump assembly 100 is a triplex pump, the respective quantities of the permanent magnets 842 and 844 may be reduced.

Figure 17:
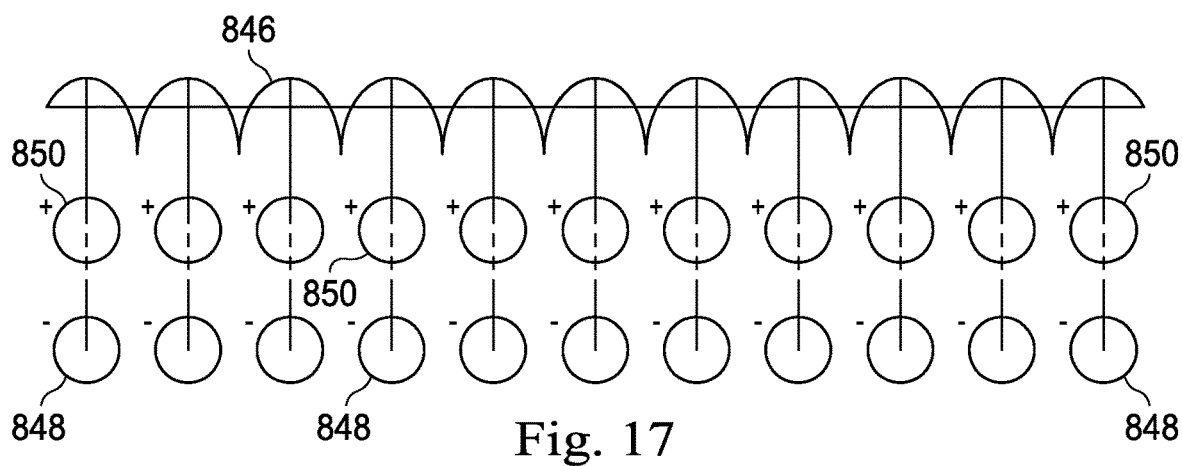

In an exemplary embodiment, as illustrated in FIG. 17 with continuing reference to FIGS. 1-16, the damper system 102 includes a plurality of fixed permanent magnets 848 having respective negative poles. In several exemplary embodiments, one or more of the fixed permanent magnets 848 are connected to the damper housing 204, the power end housing 104, or a combination thereof. The damper system 102 further includes a plurality of rotating permanent magnets 850 having respective positive poles. In several exemplary embodiments, one or more of the rotating permanent magnets 850 are connected to the flywheel 202, the crankshaft 106, or a combination thereof. In several exemplary embodiments, each of the respective negative poles of the fixed permanent magnets 848 is adapted to interact with a corresponding one of the respective positive poles of the rotating permanent magnets 850.

In several exemplary embodiments, the pump assembly 100 is a quintuplex pump, and the hydraulic pressure therein undergoes fluctuation during the operation of the quintuplex pump. The representation 846 of this hydraulic pressure fluctuation during the operation of the quintuplex pump is also shown in FIG. 17. During the above-described operation of the damper system 102, the rotating permanent magnets 850 rotate along with the flywheel 202. During this rotation, the respective negative poles of the fixed permanent magnets 848 interact with corresponding ones of the respective positive poles of the rotating permanent magnets 850, urging a joining, or meeting, between each pair of poles when the hydraulic pressure is increasing, as shown in FIG. 17. In several exemplary embodiments, the magnetic devices 208 are electromagnets, and the damper system 102 uses the magnetic devices 208 to affect the behavior of the interaction between the respective sets of negative poles of the fixed permanent magnets 848 and the rotating permanent magnets 850. As a result, in several exemplary embodiments, load is reduced and/or heat is reduced. In several exemplary embodiments, the fixed permanent magnets 848 and the rotating permanent magnets 850 are strategically placed to reduce the load.

In several exemplary embodiments, the magnetic devices 208 are used by the damper system 102 so that the magnetorheological-induced drag (to dampen changes in the mass moment of inertia) is computed and applied at the precise time that the load is created within the rotating mass (coming from the reciprocating load) so as to dampen it before it becomes a change in inertia in the rotating components. All energy to accomplish this turns to heat and this heat accumulates in the magnetorheological fluid. Therefore, this heat is dissipated using one or more cooling methods. In several exemplary embodiments, some of the predicted energy changes are held by the permanent magnets 848 and/or 850; as a result, some or all of the heat energy is cooled by, for example, flowing air, and the electrical current needed to activate the magnetorheological fluid is reduced. As shown in FIG. 17, the permanent magnets 848 and 850 are positioned according to the timing of the reciprocating energy. In FIG. 17, the pump assembly 100 being a quintuplex pump is only one example of a pump; the pump assembly 100 may be another type of pump and thus the respective quantities of the permanent magnets 848 and 850 may be increased or reduced. For example, if the pump assembly 100 is a triplex pump, the respective quantities of the permanent magnets 848 and 850 may be reduced.

In several exemplary embodiments, the damper system 102 includes one or more respective pairs of the permanent magnets 842 and 844, as well as one or more respective pairs of the permanent magnets 848 and 850; in several exemplary embodiments, these respective pairs may alternate with respect to the representation 846 of the hydraulic pressure fluctuation.

Figure 18:
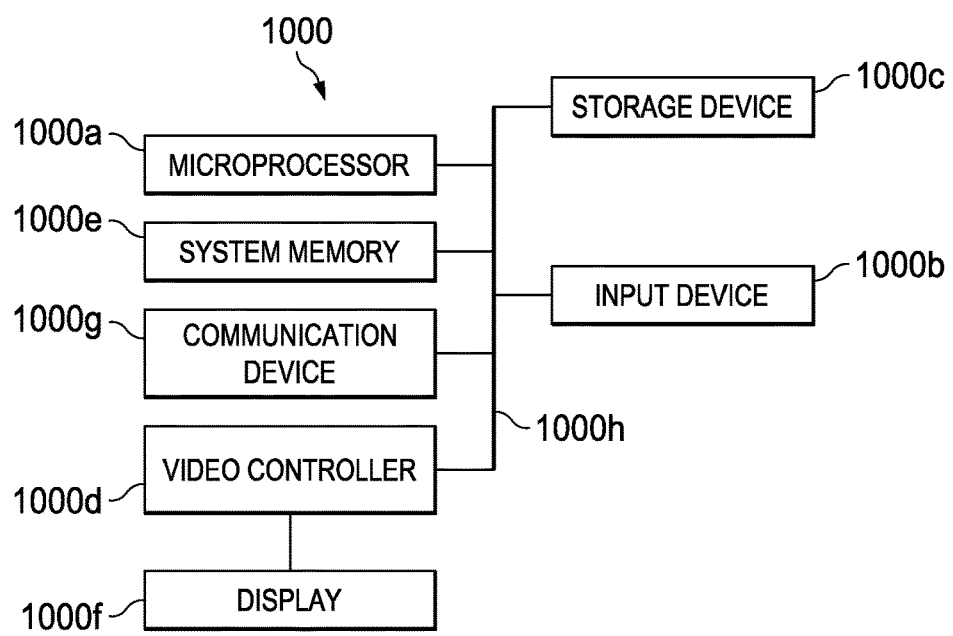
FIG. 18 is a diagrammatic illustration of a computing device for implementing one or more exemplary embodiments of the present disclosure, according to an exemplary embodiment.

In an exemplary embodiment, as illustrated in FIG. 18 with continuing reference to FIGS. 1-17, an illustrative computing device 1000 for implementing one or more embodiments of one or more of the above-described networks, elements, methods and/or steps, and/or any combination thereof, is depicted. The computing device 1000 includes a microprocessor 1000a, an input device 1000b, a storage device 1000c, a video controller 1000d, a system memory 1000e, a display 1000f, and a communication device 1000g, all of which are interconnected by one or more buses 1000h. In several exemplary embodiments, the storage device 1000c may include a floppy drive, hard drive, CD-ROM, optical drive, any other form of storage device and/or any combination thereof. In several exemplary embodiments, the storage device 1000c may include, and/or be capable of receiving, a floppy disk, CD-ROM, DVD-ROM, or any other form of computer-readable medium that may contain executable instructions. In several exemplary embodiments, the communication device 1000g may include a modem, network card, or any other device to enable the computing device to communicate with other computing devices. In several exemplary embodiments, any computing device represents a plurality of interconnected (whether by intranet or Internet) computer systems, including without limitation, personal computers, mainframes, PDAs, smartphones and cell phones.

In several exemplary embodiments, one or more of the components of the damper control system 810 and/or the damper control system 838, such as one or more of the processor 828, the computer readable medium 830, and the controller 832, include at least the computing device 1000 and/or components thereof, and/or one or more computing devices that are substantially similar to the computing device 1000 and/or components thereof. In several exemplary embodiments, one or more of the above-described components of the computing device 1000, the processor 828, the computer readable medium 830, and the controller 832, include respective pluralities of same components.

In several exemplary embodiments, a computer system typically includes at least hardware capable of executing machine readable instructions, as well as the software for executing acts (typically machine-readable instructions) that produce a desired result. In several exemplary embodiments, a computer system may include hybrids of hardware and software, as well as computer sub-systems.

In several exemplary embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several exemplary embodiments, hardware may include any physical device that is capable of storing machine-readable instructions, such as memory or other data storage devices. In several exemplary embodiments, other forms of hardware include hardware sub-systems, including transfer devices such as modems, modem cards, ports, and port cards, for example.

In several exemplary embodiments, software includes any machine code stored in any memory medium, such as RAM or ROM, and machine code stored on other devices (such as floppy disks, flash memory, or a CD ROM, for example). In several exemplary embodiments, software may include source or object code. In several exemplary embodiments, software encompasses any set of instructions capable of being executed on a computing device such as, for example, on a client machine or server.

In several exemplary embodiments, combinations of software and hardware could also be used for providing enhanced functionality and performance for certain embodiments of the present disclosure. In an exemplary embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several exemplary embodiments, computer readable mediums include, for example, passive data storage, such as a random access memory (RAM) as well as semi-permanent data storage such as a compact disk read only memory (CD-ROM). One or more exemplary embodiments of the present disclosure may be embodied in the RAM of a computer to transform a standard computer into a new specific computing machine. In several exemplary embodiments, data structures are defined organizations of data that may enable an embodiment of the present disclosure. In an exemplary embodiment, a data structure may provide an organization of data, or an organization of executable code.

In several exemplary embodiments, any networks and/or one or more portions thereof, may be designed to work on any specific architecture. In an exemplary embodiment, one or more portions of any networks may be executed on a single computer, local area networks, client-server networks, wide area networks, internets, hand-held and other portable and wireless devices and networks.

In several exemplary embodiments, a database may be any standard or proprietary database software. In several exemplary embodiments, the database may have fields, records, data, and other database elements that may be associated through database specific software. In several exemplary embodiments, data may be mapped. In several exemplary embodiments, mapping is the process of associating one data entry with another data entry. In an exemplary embodiment, the data contained in the location of a character file can be mapped to a field in a second table. In several exemplary embodiments, the physical location of the database is not limiting, and the database may be distributed. In an exemplary embodiment, the database may exist remotely from the server, and run on a separate platform. In an exemplary embodiment, the database may be accessible across the Internet. In several exemplary embodiments, more than one database may be implemented.

In several exemplary embodiments, a plurality of instructions stored on a non-transitory computer readable medium may be executed by one or more processors to cause the one or more processors to carry out or implement in whole or in part the above-described operation of each of the above-described exemplary embodiments including, but not limited to, the damper control system 810, the method 834, the method 836, the damper control system 838, and/or any combination thereof. In several exemplary embodiments, such a processor may include one or more of the microprocessor 1000a, the processor 828, any processor(s) that are part of the components of the damper control system 810 or 838, and/or any combination thereof, and such a computer readable medium may be distributed among one or more components of the damper control system 810 or 838. In several exemplary embodiments, such a processor may execute the plurality of instructions in connection with a virtual computer system. In several exemplary embodiments, such a plurality of instructions may communicate directly with the one or more processors, and/or may interact with one or more operating systems, middleware, firmware, other applications, and/or any combination thereof, to cause the one or more processors to execute the instructions.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "left" and right", "front" and "rear", "above" and "below" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes only some embodiments of the invention(s), and alterations, modifications, additions and/or changes can be made thereto without departing from the scope and spirit of the disclosed embodiments, the embodiments being illustrative and not restrictive.

Furthermore, invention(s) have been described in connection with what are presently considered to be the most practical and preferred embodiments and it is to be understood that the invention is not to be limited to the disclosed embodiments, but on the contrary, is intended to cover various modifications and equivalent arrangements included within the spirit and scope of the invention(s). Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. A damper control system for a reciprocating pump having a crank shaft, the damper control system comprising:
   at least one sensor configured to sense at least one characteristic of the reciprocating pump;
   at least one processor in communication with the at least one sensor and configured to receive the sensed at least one characteristic of the reciprocating pump and generate a control signal in response to the received at least one characteristic of the reciprocating pump;
   a fly wheel configured for coupling with the crank shaft of the reciprocating pump;
   a magnetic device configured for coupling with a housing of the reciprocating pump and proximate to the flywheel;
   a permanent magnet configured for coupling with the housing of the reciprocating pump and proximate to the flywheel; and wherein when magnetorheological fluid is being pumped by the reciprocating pump, the permanent magnet interacts with the magnetorheological fluid to apply a steady force to the flywheel, the magnetic device interacts with the magnetorheological fluid to apply a variable force to the flywheel in response to the control signal generated by the at least one processor, and the variable force and the steady force act together to dampen vibrations in the reciprocating pump.

2. The damper control system of claim 1, wherein the at least one sensor is configured to sense at least one of pressure within the reciprocating pump, rotating crankshaft position, acceleration of the flywheel, temperature of the magnetorheological fluid, and vibration of the reciprocating pump.

3. The damper control system of claim 1, wherein the magnetic device comprises an electromagnet.

4. A method of dampening vibrations in a pump having a crankshaft and driven by a drivetrain including a driveshaft, a transmission operably coupled to the driveshaft, and an engine operably coupled to the transmission, the method comprising:
    detecting a torque variation in the drivetrain;
    generating and transmitting a control signal to at least one electromagnet in response to detecting the torque variation in the drivetrain; and
    negating, using the at least one electromagnet, at least a portion of the torque variation to prevent an unacceptable generation of inertia in one or more of the driveshaft, the transmission, and the engine due to the torque variation.

5. The method of claim 4, wherein detecting the beginning of the torque variation in the pump drivetrain comprises receiving, from at least one sensor, a signal associated with at least one characteristic of the pump driven by the drivetrain.

6. The method of claim 4, wherein detecting the beginning of the torque variation in the pump drivetrain further comprises calculating, by at least one processor in response to the sensor signal, torque characteristics of the pump.

7. The method of claim 4, wherein generating the control signal comprises calculating a damper response voltage per degree of crank angle of the crankshaft.

8. The method of claim 4, wherein generating the control signal comprises:
    sensing at least one characteristic of the pump having a flywheel operably coupled to the crankshaft; and
    wherein the at least one characteristics of the pump is selected from the group consisting of a pressure within the reciprocating pump assembly, rotating crankshaft position, and acceleration of the flywheel.

9. The method of claim 8, further comprising causing, in response to the control signal, a magnetic device mounted proximate to the flywheel to apply a variable force on the flywheel, the variable force interacting with a steady force applied to the flywheel by a permanent magnet also mounted proximate to the flywheel to dampen vibrations in the pump.

10. A method of dampening vibrations in a reciprocating pump having a crankshaft coupled to a drivetrain and a flywheel coupled to the crank shaft, the method comprising:
    receiving, from at least one sensor, a sensor signal associated with at least one characteristics of the reciprocating pump;
    calculating, using at least one processor and in response to the sensor signal, torque characteristics of the reciprocating pump and the drivetrain;
    calculating, using at least one processor and in response to the calculated torque characteristics, a damper response voltage per degree of crank angle in the crankshaft; and
    generating and transmitting control signals to at least one electromagnets to apply a force to the flywheel to dampen vibrations in the reciprocating pump in response to the damper response voltage.

11. The method of claim 10, further comprising calculating correction factors and modifying the damper response voltage in response to the torque characteristics and the sensor signal.

12. The method of claim 10, further comprising:
    generating control signals in response to at least one sensor signals indicative of at least one characteristic of the reciprocating pump, including at least one of a pressure within the reciprocating pump assembly; rotating crankshaft position; and acceleration of the flywheel, a discharge pressure of the reciprocating pump; and
    transmitting the control signals to a plurality of electromagnets disposed proximate to a flywheel coupled to the crankshaft, and causing the electromagnets to apply a force to the flywheel to dampen the vibrations in the reciprocating pump.

13. The method of claim 12, wherein transmitting the controls signals to a plurality of electromagnets comprises causing the electromagnets to apply a variable force to the flywheel that interacts with a steady force applied by a permanent magnet counted proximate to the flywheel, the collective forces act to dampen the vibrations in the reciprocating pump.

14. The method of claim 10, wherein calculating the torque characteristics of the reciprocating pump and the drivetrain comprises calculating pump suction torque characteristics of the reciprocating pump.

15. The method of claim 10, wherein calculating the torque characteristics of the reciprocating pump and the drivetrain comprises calculating pump discharge torque characteristics of the reciprocating pump.

16. The method of claim 10, wherein calculating the torque characteristics of the reciprocating pump and the drivetrain comprises calculating torque characteristics of an engine in the drivetrain.

17. The method of claim 10, wherein generating and transmitting the control signals comprises generating and transmitting a voltage command for the plurality of electromagnets corresponding to control of low RPM in a suction portion of a pump stroke of the reciprocating pump.

18. The method of claim 10, wherein generating and transmitting the control signals comprises generating and transmitting a voltage command for the plurality of electromagnets corresponding to control of low RPM in the reciprocating pump.

19. The method of claim 10, wherein generating and transmitting the control signals comprises generating and transmitting a voltage command for one or more of the electromagnets corresponding to control of high RPM in the drivetrain.

20. A reciprocating pump comprising:
    a power end having a crankshaft configured to be coupled to a drivetrain;
    a fluid end coupled to the power end and having a housing defining a fluid chamber, the fluid chamber configured to receive a magnetorheological fluid therein;
    a flywheel coupled to the crankshaft of the reciprocating pump;

at least one sensor coupled to the reciprocating pump and configured to sense at least one characteristic of the reciprocating pump;

a plurality of magnetic devices coupled to the housing and proximate to the flywheel; and a processor in communication with the at least one sensor and at least one of the plurality of magnetic devices, the processor configured to generate and transmit a control signal to at least one of the plurality of magnetic devices causing it to generate a force on the flywheel, wherein a summation of forces applied to the flywheel by the plurality of magnetic devices operates to reduce vibration in the reciprocating pump.

21. The reciprocating pump of claim 20, wherein the at least one sensor is configured to sense at least one of pressure within the reciprocating pump, rotating crankshaft position, acceleration of the flywheel, temperature of the magnetorheological fluid, and vibration of the reciprocating pump.

22. The reciprocating pump of claim 20, wherein the plurality of magnetic devices comprise at least one electromagnet coupled to the processor.

23. The reciprocating pump of claim 20, wherein the plurality of magnetic devices comprise at least one permanent magnet.

24. The reciprocating pump of claim 20, wherein the at least one sensor is configured to sense at least one characteristic of the drivetrain.

* * * * *